(12) United States Patent
Kim et al.

(10) Patent No.: US 12,446,225 B2
(45) Date of Patent: Oct. 14, 2025

(54) SEMICONDUCTOR MEMORY DEVICE

(71) Applicant: Samsung Electronics Co., Ltd., Suwon-si (KR)

(72) Inventors: Ki Won Kim, Seongnam-si (KR); Sung Hoon Kim, Seongnam-si (KR); Ah Reum Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 753 days.

(21) Appl. No.: 17/696,551

(22) Filed: Mar. 16, 2022

(65) Prior Publication Data
US 2023/0074317 A1    Mar. 9, 2023

(30) Foreign Application Priority Data
Sep. 9, 2021  (KR) .......................... 10-2021-0120097

(51) Int. Cl.
| | | |
|---|---|---|
| *H10B 43/40* | (2023.01) | |
| *H01L 23/00* | (2006.01) | |
| *H01L 23/522* | (2006.01) | |
| *H01L 25/065* | (2023.01) | |
| *H01L 25/18* | (2023.01) | |
| *H10B 41/41* | (2023.01) | |

(52) U.S. Cl.
CPC ......... *H10B 43/40* (2023.02); *H01L 23/5226* (2013.01); *H01L 24/08* (2013.01); *H01L 25/0657* (2013.01); *H01L 25/18* (2013.01); *H10B 41/41* (2023.02); *H01L 2224/08145* (2013.01); *H01L 2924/1431* (2013.01); *H01L 2924/14511* (2013.01)

(58) Field of Classification Search
CPC ............. H01L 23/5221; H01L 23/5228; H01L 23/5223; H10B 43/10; H10B 43/27; G11C 5/14; G11C 16/0483; G11C 5/063
See application file for complete search history.

(56) References Cited

U.S. PATENT DOCUMENTS

| | | |
|---|---|---|
| 6,653,681 B2 | 11/2003 | Appel |
| 6,856,123 B2 | 2/2005 | Takabayashi |
| 8,582,276 B2 | 11/2013 | Chen |
| 10,115,719 B2 | 10/2018 | Singh et al. |
| 10,354,948 B2 | 7/2019 | Ding et al. |
| 10,553,531 B2 | 2/2020 | Song et al. |
| 2006/0261439 A1 | 11/2006 | Chien et al. |

(Continued)

*Primary Examiner* — Moazzam Hossain
(74) *Attorney, Agent, or Firm* — Wolf, Greenfield & Sacks, P.C.

(57) ABSTRACT

A semiconductor memory device including a memory cell array and a peripheral circuit element configured to control an operation of the memory cell array, and a wiring structure including first and second wiring structures spaced apart from each other on the peripheral circuit element, a first voltage and a second voltage different from the first voltage applied to two opposite ends of the first wiring structure, respectively, and a third voltage different from the first and second voltages applied to the second wiring structure, may be provided. The first wiring structure includes first lines extended in a first direction and spaced apart from each other in a second direction crossing the first direction, the second wiring structure includes second lines extended in the first direction and spaced apart from each other in the second direction, and one of the first lines is between the second lines.

16 Claims, 15 Drawing Sheets

(56) References Cited

U.S. PATENT DOCUMENTS

| | | |
|---|---|---|
| 2015/0294970 A1 | 10/2015 | Jakushokas et al. |
| 2018/0040553 A1* | 2/2018 | Tak ....................... H10B 41/41 |
| 2021/0159327 A1 | 5/2021 | Yun et al. |
| 2025/0014652 A1* | 1/2025 | Moriyama ............. H10B 41/27 |

* cited by examiner

130_D

SEMICONDUCTOR MEMORY DEVICE

CROSS-REFERENCE TO RELATED APPLICATION

This application claims priority from Korean Patent Application No. 10-2021-0120097 filed on Sep. 9, 2021 in the Korean Intellectual Property Office and all the benefits accruing therefrom under 35 U.S.C. 119, the contents of which in its entirety are herein incorporated by reference.

BACKGROUND

Technical Field

The present disclosure relates to semiconductor memory devices.

Description of the Related Art

A nonvolatile memory capable of storing high-capacity data has been required for an electronic system that requires data storage. Therefore, a method capable of increasing data storage capacity of a highly integrated nonvolatile memory has been studied. For example, as one of methods for increasing data storage capacity of a nonvolatile memory device, a nonvolatile memory including three-dimensionally arranged memory cells has been suggested instead of a nonvolatile memory including two-dimensionally arranged memory cells.

Also, methods for reducing a chip size of a nonvolatile memory have been suggested.

SUMMARY

An example embodiment of the present disclosure provides a semiconductor memory device that includes a wiring structure used as an RC element to improve area efficiency of a chip.

An example embodiment of the present disclosure provides a semiconductor memory device that generates additional RC through an out-of-circuit layout using a wiring structure, in which lines are adjacent to each other and cross each other, to reduce a circuit area, thereby improving area efficiency of a chip.

However, example embodiments of the present disclosure are not restricted to the one set forth herein. The above and other aspects of the present disclosure will become more apparent to one of ordinary skill in the art to which the present disclosure pertains by referencing the detailed description of the present disclosure given below.

According to an example embodiment of the present disclosure, a semiconductor memory device may include a memory cell array on a substrate, the memory cell array including a memory cell configured to store data, a peripheral circuit element on an upper surface of the substrate, the peripheral circuit element configured to control an operation of the memory cell array, and a wiring structure on the peripheral circuit element, the wiring structure including a first wiring structure and a second wiring structure, the first wiring structure and the second wiring structure spaced apart from each other with an insulating layer interposed therebetween, the first wiring structure configured to receive a first voltage at one end thereof, the first wiring structure configured to receive a second voltage different from the first voltage at the other end thereof due to resistance of the first wiring structure, the second wiring structure configured to receive a third voltage different from the first and second voltages. The first wiring structure may include (1_1)th and (1_2)th lines extended in a first direction and spaced apart from each other in a second direction crossing the first direction, the second wiring structure may include (2_1)th and (2_2)th lines extended in the first direction and spaced apart from each other in the second direction, and the (1_1)th line may be between the (2_1)th line and the (2_2)th line.

According to an example embodiment of the present disclosure, a semiconductor memory device may include a memory cell array on a substrate, the memory cell array including a memory cell configured to store data, a peripheral circuit element on an upper surface of the substrate, the peripheral circuit element configured to control an operation of the memory cell array, and a wiring structure including first and second wiring structures, the first and second wiring structures connected with the peripheral circuit element through a contact vertically extended onto the substrate, the first and second wiring structures spaced apart from each other with an insulating layer interposed therebetween, a first voltage being applied to one end of the first wiring structure, a second voltage different from the first voltage being applied to the other end of the first wiring structure by resistance of the first wiring structure, and a third voltage different from the first and second voltages being applied to the second wiring structure. At least a portion of the first wiring structure and at least a portion of the second wiring structure may be at a same level based on the substrate.

According to an example embodiment of the present disclosure, a semiconductor memory device may include a memory cell region including a first metal pad, a peripheral circuit region including a second metal pad, the peripheral circuit region vertically connected with the first metal pad by the second metal pad, a memory cell array including a plurality of cell strings each including a plurality of memory cells for storing data, a plurality of word lines connected to a plurality of memory cells, respectively and a plurality of bit lines connected to one end of the plurality of cell strings, in the memory cell region, a control logic within the peripheral circuit region and including a peripheral circuit element, the control logic configured to control an operation of the memory cell array, and a wiring structure on the peripheral circuit element and including first and second wiring structures, the first and second wiring structures spaced apart from each other with an insulating layer interposed therebetween, a first voltage being applied to one end of the first wiring structure, a second voltage different from the first voltage being applied to the other end of the first wiring structure by resistance of the first wiring structure, and a third voltage different from the first and second voltages being applied to the second wiring structure. The first wiring structure may include (1_1)th and (1_2)th lines extended in a first direction and spaced apart from each other in a second direction crossing the first direction, the second wiring structure may include (2_1)th and (2_2)th lines extended in the first direction and spaced apart from each other in the second direction, and the (1_1)th line may be between the (2_1)th line and the (2_2)th line.

Other features and other example embodiments may be apparent from the following detailed description, the drawings and the claims.

BRIEF DESCRIPTION OF THE DRAWINGS

The above and other aspects and features of the present disclosure will become more apparent by describing in detail some example embodiments thereof with reference to the attached drawings, in which.

DETAILED DESCRIPTION

Figure 1:
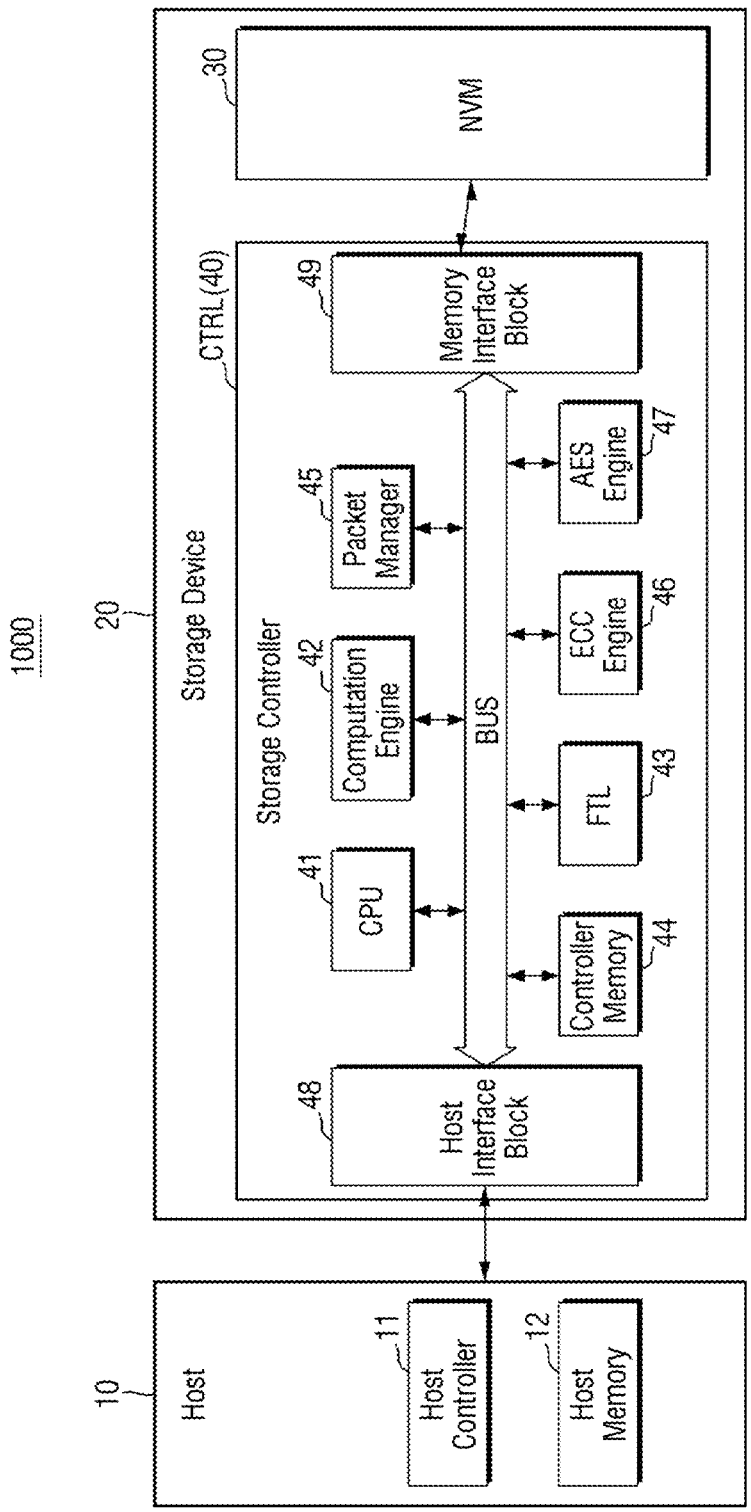
FIG. 1 is a block diagram illustrating a storage system according to an example embodiment of the present disclosure.

Hereinafter, some example embodiments according to technical spirits of the present disclosure will be described with reference to the accompanying drawings. In description of FIGS. 1 to 15, the same reference numerals are used for the substantially same elements, and a repeated description of the corresponding elements will be omitted. Also, similar reference numerals are used for similar elements through the drawings of the present disclosure.

FIG. 1 is a block diagram illustrating a storage system 1000 according to an example embodiment of the present disclosure. Referring to FIG. 1, the storage system 1000 may include a host device 10 and a storage device 20. In one example embodiment, the storage system 1000 may be a mobile system such as a mobile phone, a smart phone, a tablet personal computer (tablet PC), a wearable device, a healthcare device, or an Internet of things (IoT) device. In one example embodiment, the storage system 1000 may be a computing device, such as a personal computer, a laptop computer, a server and a media player, or a system such as an automotive device such as navigator.

In one example embodiment, the storage device 20 may be a semiconductor memory device, and may be a computational storage device configured to perform various computation operations in addition to a general function (e.g., data storage and output) of a conventional storage device. Hereinafter, for convenience of description, the storage device and terms related to the storage device will be used together.

The host device 10 may store data in the storage device 20 or read data stored in the storage device 20. The host device 20 may include a host controller 11 and a host memory 12. The host controller 11 may be configured to control the storage device 12. In one example embodiment, the host controller 11 may communicate with the storage device 20 based on a desired (or alternatively, predetermined) interface. The desired (or alternatively, predetermined) interface may be an interface based on a non-volatile memory express (NVMe) standard, but the scope of the present disclosure is not limited thereto.

The host memory 12 may be a buffer memory, an operation memory or a system memory of the host device 10. For example, the host memory 12 may be configured to store various information desired to operate the host device 10. The host memory 12 may be used as a buffer memory for temporarily storing data to be transmitted to the storage device 20 or data received from the storage device 20. In one example embodiment, the host memory 12 may support access by the storage device 20.

In one example embodiment, each of the host controller 11 and the host memory 12 may be implemented as a separate semiconductor chip. In one example embodiment, the host controller 11 and the host memory 12 may be integrated into a single semiconductor chip or implemented in a multi-chip package. For example, the host controller 11 may be any one of a plurality of modules provided in an application processor. The application processor may be implemented as a system on chip (SoC). The host memory 12 may be an embedded memory provided in the application processor, or may be a nonvolatile memory, a volatile memory device, a nonvolatile memory module, or a volatile memory module, which is disposed outside the application processor.

The storage device 20 may be a storage medium configured to store data or output stored data in response to a request from the host device 10. In one example embodiment, the storage device 20 may include at least one of a solid state drive (SSD), an embedded memory, or a detachable external memory. When the storage device 20 is the SSD, the storage device 20 may be a device that conforms to the nonvolatile memory express (NVMe) standard. When the storage device 20 is the embedded memory or the external memory, the storage device 20 may be a device that conforms to a universal flash storage (UFS) standard or an embedded multi-media card (eMMC) standard. Each of the host device 10 and the storage device 20 may generate and transmit packets according to a standard protocol that is employed.

The storage device 20 may include a storage controller (CTRL) 40 and a nonvolatile memory (NVM) 30. The storage controller CTRL 40 may include a central processing unit (CPU) 41, a computation engine 42, a flash translation layer (FTL) 43, a controller memory 44, a packet manager 45, an error correction code (ECC) engine 46, an advanced encryption standard (AES) engine 47, a host interface block 48, a memory interface block 49, and a system bus BUS. In one example embodiment, each of the various components included in the storage controller CTRL 40 may be implemented as an intellectual property (IP) block or functional block, and may be implemented in the form of software, hardware, firmware or their combination.

The CPU 41 may control an overall operation of the storage controller CTRL 40. For example, the CPU 41 may be configured to drive various kinds of firmware or software driven in the storage controller CTRL 40.

The computation engine 42 may be configured to perform various computation operations performed in the storage controller CTRL 40 or to drive an application or computation program performed on the storage controller CTRL 40. In one example embodiment, the computation engine 42 may be configured to perform some functions of a host application driven on the host device 10. In one example embodiment, an internal application may be configured to perform an encryption operation, a filtering operation and various data computation operations such as convolution computation for machine learning.

In one example embodiment, the CPU 41 and the computation engine 42 are shown as separate functional blocks, but the scope of the present disclosure is not limited thereto. For example, each of the CPU 41 and the computation engine 42 may be implemented as a separate processor core. In one example embodiment, the CPU 41 and the computation engine 42 may be implemented as a single processor core, or may be implemented as a multi-core processor that includes a plurality of processor cores.

The FTL 43 may perform various maintenance operations for efficiently utilizing the nonvolatile memory NVM. For example, the maintenance operations may include an address mapping operation, a wear-leveling operation, a garbage collection operation, and the like.

The address mapping operation may be an operation of converting or mapping between a logical address managed by the host device 20 and a physical address of the nonvolatile memory NVM.

The wear-leveling operation may indicate an operation of uniformizing frequency of use or the number of uses of a plurality of memory blocks included in the nonvolatile memory NVM, and may be implemented through firmware techniques for balancing erase counts of physical blocks or hardware. In one example embodiment, the plurality of memory blocks of the nonvolatile memory NVM may be used uniformly through the wear-leveling operation, whereby excessive degradation of a particular memory block may be avoided. As a result, lifetime of the nonvolatile memory NVM may be improved.

The garbage collection operation may indicate an operation of making sure of an available memory block or free memory block of the nonvolatile memory NVM by erasing a source memory block of the nonvolatile memory NVM after copying valid data of the source memory block of the nonvolatile memory NVM to a target memory block.

In one example embodiment, the FTL 43 may be implemented in the form of firmware or software, and may be stored in the controller memory 44 or a separate operating memory (not shown). The CPU 41 may perform the aforementioned various maintenance operations by driving the FTL 43 stored in the controller memory 44 or the separate operation memory (not shown). In one example embodiment, the FTL 43 may be implemented through various hardware automation circuits configured to perform the aforementioned various maintenance operations. That is, the FTL 43 may be implemented in hardware, and the aforementioned various maintenance operations may be performed through hardware.

The controller memory 44 may operate as a buffer memory or operation memory of the storage controller CTRL 40. For example, the controller memory 44 may temporarily store data received from the host device 20 or the nonvolatile memory (NVM). In one example embodiment, the controller memory 44 may store various kinds of information or program codes desired for the operation of the storage controller CTRL 40. The CPU 41 may perform various operations based on the information or program codes stored in the controller memory 44.

In one example embodiment, the controller memory 44 may be configured to store the data used by the computation engine 42 or a program code for an application that is driven by the computation engine 42. The computation engine 42 may execute the program code stored in the controller memory 44 or perform various computations for the data stored in the controller memory 44.

For conciseness of the drawings and convenience of description, the controller memory 44 is shown as being included in the storage controller CTRL, but the scope of the present disclosure is not limited thereto. The controller memory 44 may be a separate memory module or a memory device, which is positioned outside the storage controller CTRL 40. The storage controller CTRL may further include a memory controller (not shown) configured to control a memory module or a memory device, which is positioned outside.

The packet manager 45 may be configured to parse a packet received from the host device 20 or generate a packet for data to be transmitted to the host device 20. In one example embodiment, the packet may be generated based on an interface protocol between the host device 10 and the storage device 20.

The ECC engine 46 may perform error detection and correction functions for data read from the nonvolatile memory NVM. For example, the ECC engine 46 may generate parity bits for write data to be stored in the nonvolatile memory NVM. The generated parity bits may be stored in the nonvolatile memory NVM along with write data. Afterwards, during a read operation for the nonvolatile memory NVM, the ECC engine 46 may correct an error of the write data by using the read data and corresponding parity bits and output the error-corrected read data.

The AES engine 47 may perform at least one of an encryption operation or a decryption operation for the data input to the storage controller CTRL 40 by using a symmetric-key algorithm.

The storage controller CTRL 40 may communicate with the host device 10 through the host interface block 48. In order to easily describe the example embodiments of the present disclosure, it is assumed that the host interface block 48 supports an interface according to the nonvolatile memory express (NVMe) standard, but the scope of the present disclosure is not limited thereto. The host interface block 48 may be configured to support at least one of a variety of interfaces such as an Advanced Technology Attachment (ATA) interface, a Serial ATA (SATA) interface, an external SATA (e-SATA) interface, a Small Computer Small Interface (SCSI), a Serial Attached SCSI (SAS), a Peripheral Component Interconnection (PCI) interface, a PCI express (PCIe) interface, IEEE 1394, a universal serial bus (USB) interface, a secure digital (SD) card interface, a multi-media card (MMC) interface, an embedded MMC (eMMC) interface, a Universal Flash Storage (UFS) interface, an embedded UFS (eUFS) interface, or a compact flash (CF) card interface.

The storage controller CTRL 40 may communicate with the nonvolatile memory NVM through the memory interface block 49. In one example embodiment, the memory interface block 49 may be configured to support a flash interface such as a toggle interface or an open NAND flash interface (ONFI), but the scope of the present disclosure is not limited thereto.

The various components included in the storage controller CTRL 40 may communicate with each other through the system bus BUS. The system bus BUS may include various system buses such as an Advanced System Bus (ASB), an Advanced Peripheral Bus (APB), an Advanced High Performance Bus (AHB) and an Advanced eXtensible Interface (AXI).

The nonvolatile memory NVM 30 may store data, output the stored data or erase the stored data under the control of the storage controller CTRL 40.

In one example embodiment, the nonvolatile memory NVM 30 is a semiconductor memory device, or may be a two-dimensional or three-dimensional NAND flash memory device but the scope of the present disclosure is not limited thereto. The nonvolatile memory NVM 30 may be a memory device based on a magnetic RAM (MRAM), a spin-transfer torque MRAM, a Conductive bridging RAM (CBRAM), a Ferroelectric RAM (FeRAM), a phase RAM (PRAM), a Resistive RAM, and other various types of memories. In one example embodiment, the nonvolatile memory NVM 30 may include a plurality of nonvolatile memories, each of which may be implemented as a separate chip or a separate package. The storage controller CTRL 40 may communicate with the plurality of nonvolatile memories of the nonvolatile memory NVM 30 through a plurality of channels, respectively.

As described above, the storage device 20 according to the example embodiment may perform various computation operations by executing various applications using the computation engine 42 of the storage controller CTRL 40. In this case, because load of computation to be performed in the host device 10 may be reduced, overall performance of the storage system 1000 may be improved.

Figure 2:
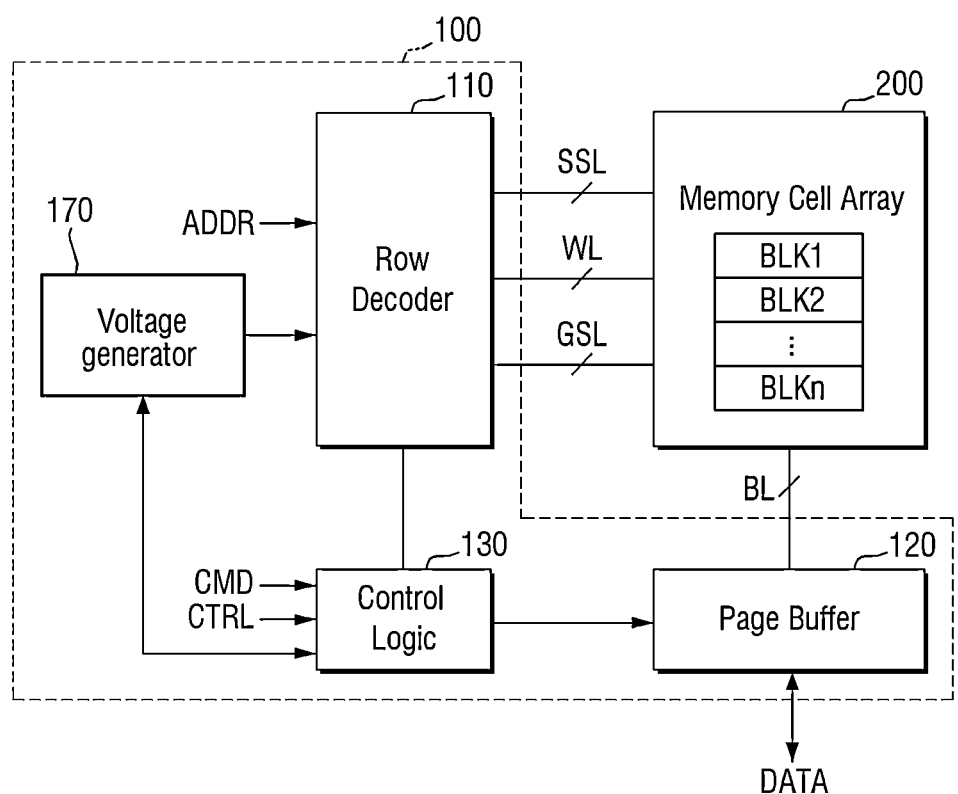
FIG. 2 is a block diagram illustrating a nonvolatile memory according to an example embodiment of the present disclosure.

FIG. 2 is a block diagram illustrating a nonvolatile memory according to an example embodiment of the present disclosure.

Referring to FIG. 2, a nonvolatile memory 30 may include a memory cell array 200 and a peripheral circuit 100.

The memory cell array 200 may include first to (n)th memory cell blocks BLK1 to BLKn. The first to (n)th memory cell blocks BLK1 to BLKn each may include a plurality of memory cells that include a semiconductor element. Each memory cell may store data of one bit or data of two or more bits. A memory cell capable of storing data of one bit is referred to as a single level cell (SLC) or a single bit cell. A memory cell capable of storing data of two or more bits is referred to as a multi-level cell (MLC) or a multi-bit cell.

The first to (n)th memory cell blocks BLK1 to BLKn may be connected to the peripheral circuit 100 through bit lines BL, word lines WL, at least one string selection line SSL, and at least one ground selection line GSL.

For example, the first to (n)th memory cell blocks BLK1 to BLKn may be connected to the row decoder 110 through the word lines WL, at least one string selection line SSL, and at least one ground selection line GSL. Further, the first to (n)th memory cell blocks BLK1 to BLKn may be connected to a page buffer 120 through the bit lines BL.

The peripheral circuit 100 may receive an address ADDR, a command CMD, and a control signal CTRL from the outside of the nonvolatile memory 30, and may transmit and receive data to and from an external device of the nonvolatile memory 30. The peripheral circuit 100 may include a control logic 130, a row decoder 110, a page buffer 120, and a voltage generator 170 for generating various voltages desired for operation.

Although not shown, the peripheral circuit 100 may further include various sub-circuits such as an input/output circuit and an error correction circuit for correcting an error of the data read from the memory cell array 200 of the nonvolatile memory 30.

The control logic 130 may be connected to the row decoder 110, the voltage generator 170, and the page buffer 120. The control logic 130 may control the overall operation of the nonvolatile memory 30. The control logic 130 may generate various internal control signals used in the nonvolatile memory 30 in response to the control signal CTRL or generate the various internal control signals by being delayed for a proper timing, and may serve as a controller of the memory cell array 200.

The control logic 130 may include a delay circuit 130_D (see FIG. 5) for delaying the input of the control signal CTRL or delaying the output of the internal control signal, and may include an RC element that is an internal control signal delay element. The RC element may be an electrical element to which a resistor and a capacitor are directly connected, and may be implemented by the resistor and the capacitor, which are connected in series, in parallel, or in combination thereof.

For example, the control logic 130 may adjust a voltage level of an operating voltage provided to the word lines WL and the bit lines BL when performing a memory operation such as a program operation or an erase operation.

The row decoder 110 may include a plurality of pass transistors to select at least one of the first to (n)th memory cell blocks BLK1 to BLKn in response to the address ADDR, wherein the plurality of pass transistors may select at least one word line WL and at least one string selection line SSL and at least one ground selection line GSL of the selected first to (n)th memory cell blocks BLKa to BLKn.

The voltage generator 170 may be controlled by the control logic 130, and may transfer an operating voltage for performing a memory operation to the memory cell array 200 to the plurality of pass transistors of the row decoder 110 through the control logic 130, and may include a linear regulator that removes signal noise and converts a voltage. The linear regulator may include a compensation circuit that includes an RC element.

For example, the voltage generator 170 may generate a strong voltage (e.g., 20V) applied to the substrate during an erase operation for at least one of the first to (n)th memory cell blocks BLK1 to BLKn.

The page buffer 120 may be connected to the memory cell array 200 through the bit lines BL. The page buffer 120 may operate as a write driver or a sense amplifier. For example, during a program operation, the page buffer 120 may be operated as a write driver to apply a voltage according to the data, which is to be stored in the memory cell array 200, to the bit lines BL. Meanwhile, during a read operation or a verification operation, the page buffer 120 may operate as a sense amplifier to sense the data stored in the memory cell array 200, and may sense whether the data of the memory cell block has been erased.

Figure 3:
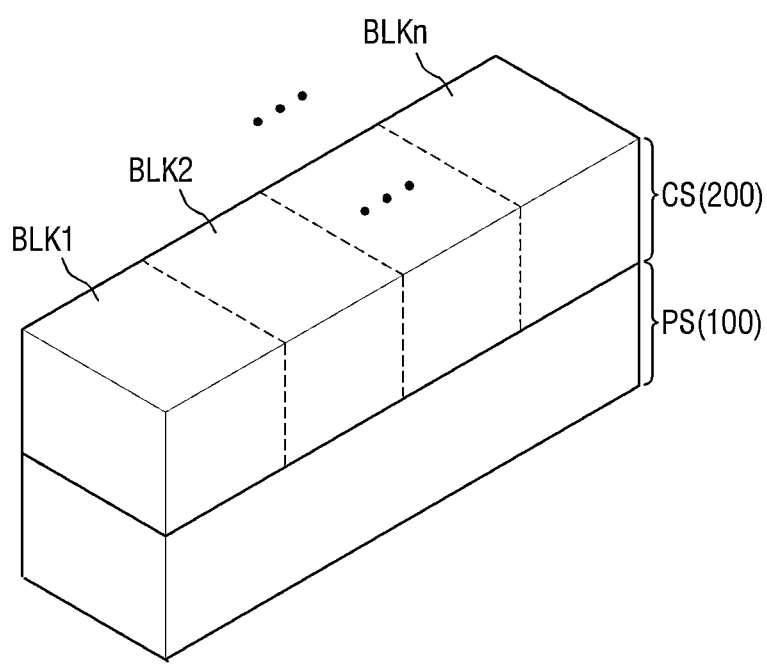
FIG. 3 is a schematic perspective view illustrating a nonvolatile memory according to an example embodiment of the present disclosure.

FIG. 3 is a perspective view illustrating a nonvolatile memory 30 according to an example embodiment of the present disclosure.

Referring to FIG. 3, the nonvolatile memory 30 according to an example embodiment may include a peripheral logic structure PS and a cell array structure CS.

The cell array structure CS may be stacked on the peripheral logic structure PS. That is, the peripheral logic structure PS and the cell array structure CS may overlap each other in a plan view. The semiconductor memory device according to some example embodiments of the present disclosure may have a cell-over-peri (COP) structure.

For example, the cell array structure CS is a memory cell region that includes the memory cell array 200 of FIG. 2, and the peripheral logic structure PS is a peripheral circuit region that includes the peripheral circuit 100 of FIG. 2.

The cell array structure CS may include a plurality of memory cell blocks BLK1 to BLKn disposed on the peripheral logic structure PS.

Figure 4:
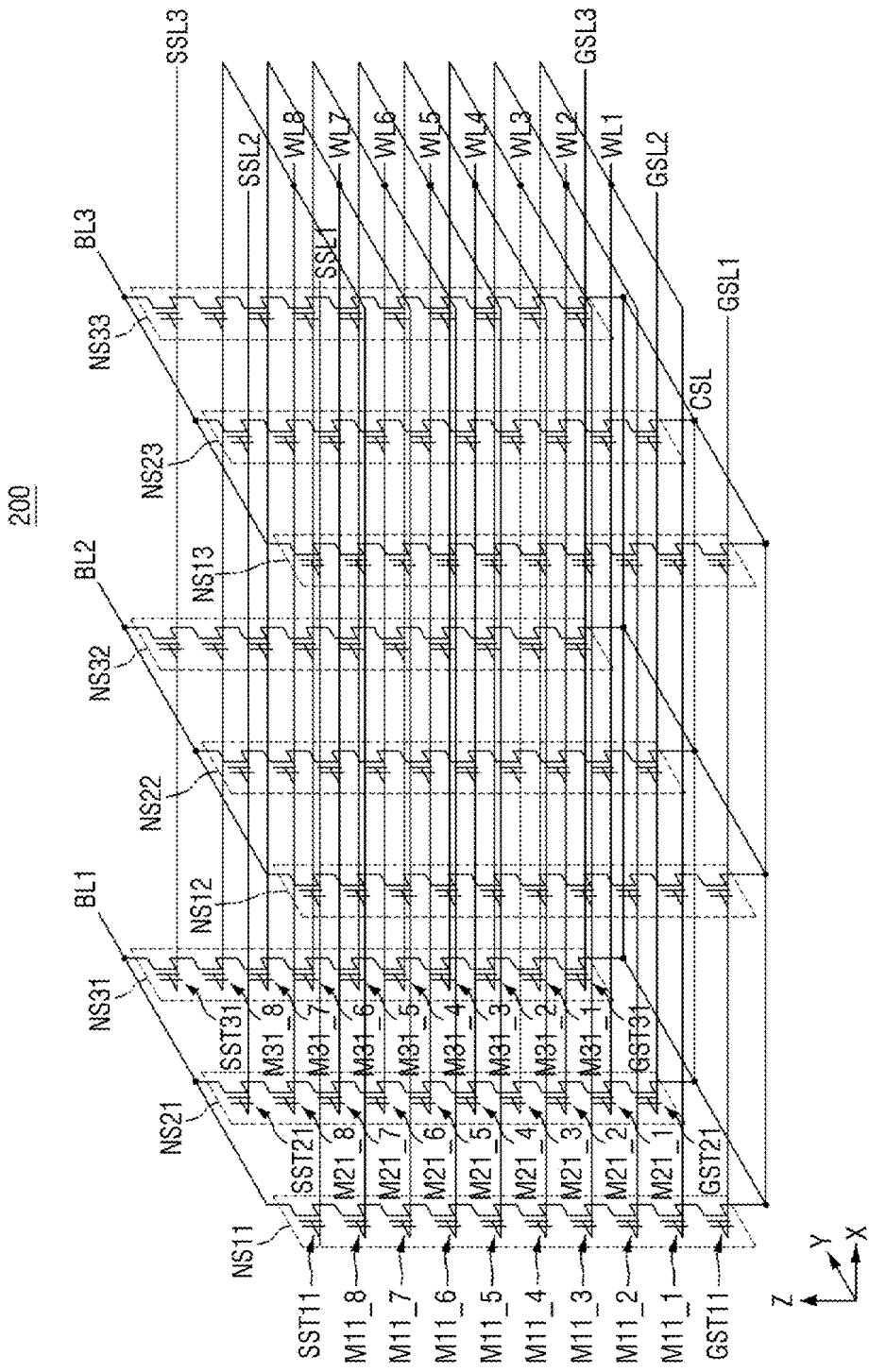
FIG. 4 is a circuit diagram illustrating a memory cell array according to an example embodiment of the present disclosure.

FIG. 4 is a circuit diagram illustrating a memory cell array 200 according to an example embodiment of the present disclosure.

Referring to FIG. 4, a plurality of cell strings NS11, NS21, NS31, NS12, NS22, NS32, NS13, NS23 and NS33 may be disposed on a substrate (not shown) in a first direction X and a second direction Y. The plurality of cell strings NS11, NS21, NS31, NS12, NS22, NS32, NS13, NS23 and NS33 may have a shape extended in a third direction Z. The plurality of cell strings NS11, NS21, NS31, NS12, NS22, NS32, NS13, NS23 and NS33 may commonly be connected to a common source line CSL formed on the substrate (not shown) or within the substrate (not shown). Although the common source line CSL is shown to be physically connected to the lowest end of the plurality of cell strings NS11, NS21, NS31, NS12, NS22, NS32, NS13, NS23 and NS33 in the third direction Z, it is sufficient that the common source line CSL is electrically connected to the lowest end of the plurality of cell strings NS11, NS21, NS31, NS12, NS22, NS32, NS13, NS23 and NS33 in the third direction Z. The common source line CSL is not limited to being physically positioned at the lower end of the plurality of cell strings NS11, NS21, NS31, NS12, NS22, NS32, NS13, NS23 and NS33. In addition, although the plurality of cell strings NS11, NS21, NS31, NS12, NS22, NS32, NS13, NS23 and NS33 are shown to be disposed in a 3×3 array, the array type and the number of the plurality of cell strings disposed in the memory cell array 200 are not limited thereto.

Cell strings NS11, NS12 and NS13 may be connected with a first ground selection line (GSL) GSL1. Cell strings NS21, NS22 and NS23 may be connected with a second ground selection line GSL2. Cell strings NS31, NS32 and NS33 may be connected with a third ground selection line GSL3.

Further, Cell strings NS11, NS12 and NS13 may be connected with a first string selection line (SSL) SSL1. Cell strings NS21, NS22 and NS23 may be connected with a second string selection line SSL2. Cell strings NS31, NS32 and NS33 may be connected with a third string selection line SSL3.

Each of the plurality of cell strings NS11, NS21, NS31, NS12, NS22, NS32, NS13, NS23 and NS33 may include a string selection transistor (SST) connected with each of the string selection lines. Further, each of the plurality of cell strings NS11, NS21, NS31, NS12, NS22, NS32, NS13, NS23 and NS33 may include a ground selection transistor (GST) connected with each of the ground selection lines.

One end of the ground selection transistor of each of the plurality of cell strings NS11, NS21, NS31, NS12, NS22, NS32, NS13, NS23 and NS33 may be connected with the common source line CSL. Further, a plurality of memory cells may sequentially be stacked between the ground selection transistor and the string selection transistor of each of the plurality of cell strings NS11, NS21, NS31, NS12, NS22, NS32, NS13, NS23 and NS33 in the third direction Z. Although not shown in this drawing, each of the plurality of cell strings NS11, NS21, NS31, NS12, NS22, NS32, NS13, NS23 and NS33 may include dummy cells between the ground selection transistor and the string selection transistor. Further, the number of string selection transistors included in each string is not limited to this drawing.

For example, the cell string NS11 may include a ground selection transistor GST11 disposed at the lowest end in the third direction Z, a plurality of memory cells M11_1 to M11_8 sequentially stacked on the ground selection transistor GST11 in the third direction Z, and a string selection transistor SST11 stacked on the uppermost memory cell M11_8 in the third direction Z. Further, the cell string NS21 may include a ground selection transistor GST21 disposed at the lowest end in the third direction Z, a plurality of memory cells M21_1 to M21_8 sequentially stacked on the ground selection transistor GST21 in the third direction Z, and a string selection transistor SST21 stacked on the uppermost memory cell M 21_8 in the third direction Z. Further, the cell string NS31 may include a ground selection transistor GST31 disposed at the lowest end in the third direction Z, a plurality of memory cells M31_1 to M31_8 sequentially stacked on the ground selection transistor GST31 in the third direction Z, and a string selection transistor SST31 stacked on the uppermost memory cell M31_8 in the third direction Z. This configuration may similarly be applied to the configuration of the other strings.

Memory cells positioned at the same height in the third direction Z from the substrate (not shown) or the ground selection transistor may electrically and commonly be connected to a corresponding word line. For example, the memory cells of the height at which the memory cells M11_1, M21_1 and M31_1 are formed may be connected with the first word line WL1. Further, the memory cells of the height at which the memory cells M11_2, M21_2 and M31_2 are formed may be connected with the second word line WL2. Because the arrangement and structure of the memory cells connected with the third word line WL3 to the eighth word line WL8 are similar to the above arrangement and structure, their description will be omitted.

One end of the string selection transistor of each of the plurality of cell strings NS11, NS21, NS31, NS12, NS22, NS32, NS13, NS23 and NS33 may be connected with bit lines BL1, BL2 and BL3. For example, the string selection transistors SST11, SST21 and SST31 may be connected with the bit line BL1 extended in the second direction Y. Because the other string selection transistors connected with the other bit lines BL2 and BL3 are similar to this configuration, their description will be omitted.

Memory cells corresponding to one string (or ground) selection line and one word line may form one page. The write operation and the read operation may be performed in units of each page. Each memory cell of each page may store two or more bits. The bits written in the memory cells of each page may form logic pages.

The memory cell array 200 may be provided as a three-dimensional memory array. The three-dimensional memory array may monolithically be formed at one or more physical levels of arrays of memory cells having an active area disposed over a circuit associated with the operation of the memory cells and the substrate (not shown). The circuit associated with the operation of the memory cells may be positioned in or over the substrate. Monolithically forming means that layers of the respective levels of the three-dimensional array may directly be stacked on layers of lower levels of the three-dimensional array. In one example embodiment, the circuit associated with the operation of the memory cells may be connected with a contact portion at the uppermost end in the third direction Z.

Figure 5:
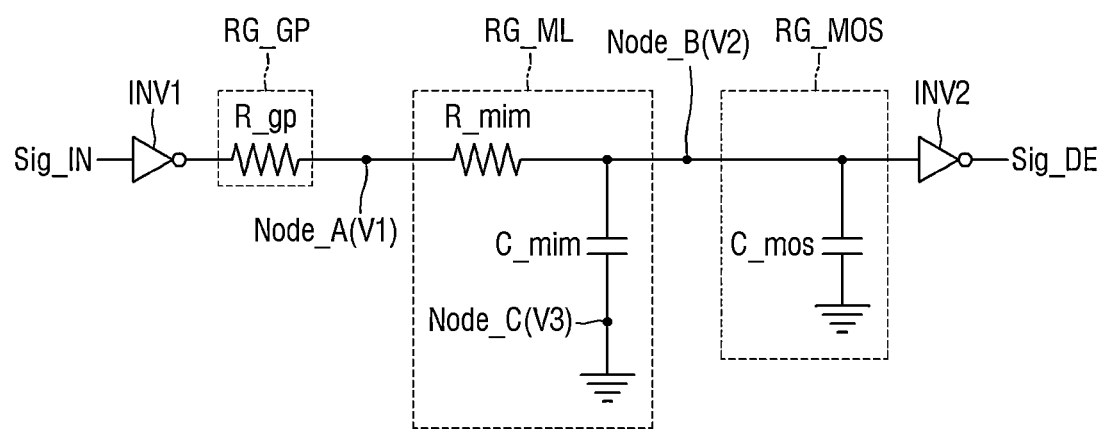
FIG. 5 is a circuit diagram illustrating a delay circuit in a control logic according to an example embodiment of the present disclosure.

FIG. 5 is a circuit diagram illustrating a delay circuit 130_D in the control logic 130 according to some embodiments of the present disclosure.

The delay circuit 130_D may include a first inverter INV1, a second inverter INV2, a gate poly resistor R_gp, a MOS capacitor C_mos, a wiring resistor R_mim, and a wiring capacitor C_mim Meanwhile, the gate poly resistor R_gp may be replaced with an active resistor R_act, but hereinafter, the present disclosure will be described with reference to the gate poly resistor R_gp.

The first inverter INV1 may be connected between an input node to which an input signal Sig_IN is input and a first node Node_A, and may be connected in series between the input node and the first node Node_A in relation to the gate poly resistor R_gp. The first inverter INV1 may invert the input signal Sig_IN and provide the inverted input signal to the gate poly resistor R_gp.

The gate poly resistor R_gp corresponds to a gate electrode of a gate structure, and the gate electrode may include a conductive material such as a conductive poly. The gate poly resistor R_gp is disposed in a gate poly region RG_GP, which will be described later, and a detailed description related to the arrangement of the gate poly resistor R_gp will be described later with reference to FIGS. 7 and 8.

The wiring resistor R_mim may be connected between the first node Node_A and a second node Node_B. The wiring resistor R_min is a resistor and its first voltage V1 applied to the first node Node_A is different from its second voltage V2 applied to the second node Node_B.

The wiring resistor R_mim corresponds to a wiring structure that includes a plurality of wires, and the plurality of wires are connected in series between the first node Node_A and the second node Node_B. The wiring resistor R_mim may correspond to a first wiring structure MLS1 of FIGS. 6 to 10. The wiring resistor R_mim is disposed in a wiring region RG_ML, which will be described later, and a detailed description related to the arrangement of the wiring resistor R_mim will be described later with reference to FIGS. 7 and 8.

The wiring capacitor C_mim may be connected between the second node Node_B and a third node Node_C. The wiring capacitor C_mim is a capacitor, and its second voltage V2 applied to the second node Node_B is different from its third voltage V3 applied to a third node Node_C. In accordance with one example embodiment, the third node Node_C may be grounded.

The wiring capacitor C_mim corresponds to a dielectric and wiring structures spaced apart from each other with the dielectric interposed therebetween, wherein the dielectric may correspond to a dielectric layer. The wiring capacitor C_mim may correspond to dielectric layers ILD2 and ILD3 and a wiring structure MLS of FIGS. 6 to 10. The wiring capacitor C_mim is disposed in the wiring region RG_ML, which will be described later, and a detailed description related to the arrangement of the wiring capacitor C_mim will be described later with reference to FIGS. 7 and 8.

The MOS capacitor C_mos may be connected between the second node Node_B and a ground terminal, and the MOS capacitor C_mos is a capacitor and its second voltage V2 applied to the second node Node_B is different from its ground voltage applied to the ground terminal.

The MOS capacitor C_mos corresponds to a transistor that includes a gate electrode, a source/drain, and a gate insulating layer disposed between the gate electrode and the source/drain, and the gate insulating layer may correspond to a dielectric of a capacitor.

The MOS capacitor C_mos is disposed in a MOS capacitor region RG_MOS, which will be described later, and a detailed description related to the arrangement of the MOS capacitor C_mos will be described later with reference to FIGS. 7 and 8.

The gate poly resistor R_gp and the wiring resistor R_mim may be connected in series to operate as one resistor in an RC delay element, and the MOS capacitor C_mos and the wiring capacitor C_mim may be connected in parallel between the second node Node_B and the ground terminal to operate as one capacitor in the RC delay element.

The second inverter INV2 is connected to the second node Node_B to invert the signal delayed by the RC delay element, thereby outputting a delayed signal Sig_DE.

Figure 6:
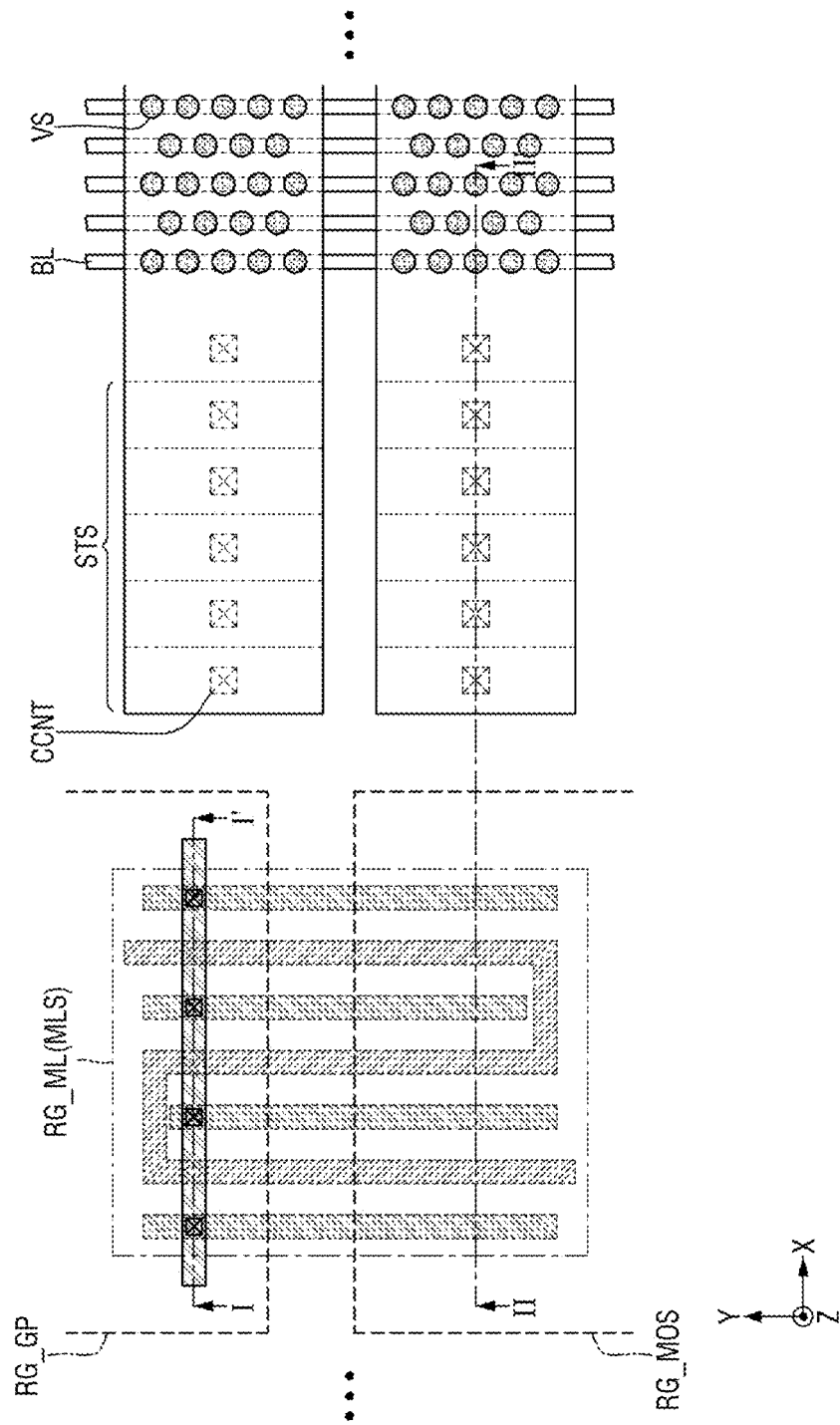
FIG. 6 is a plan view illustrating a portion of a nonvolatile memory according to an example embodiment of the present disclosure.
Figure 9:
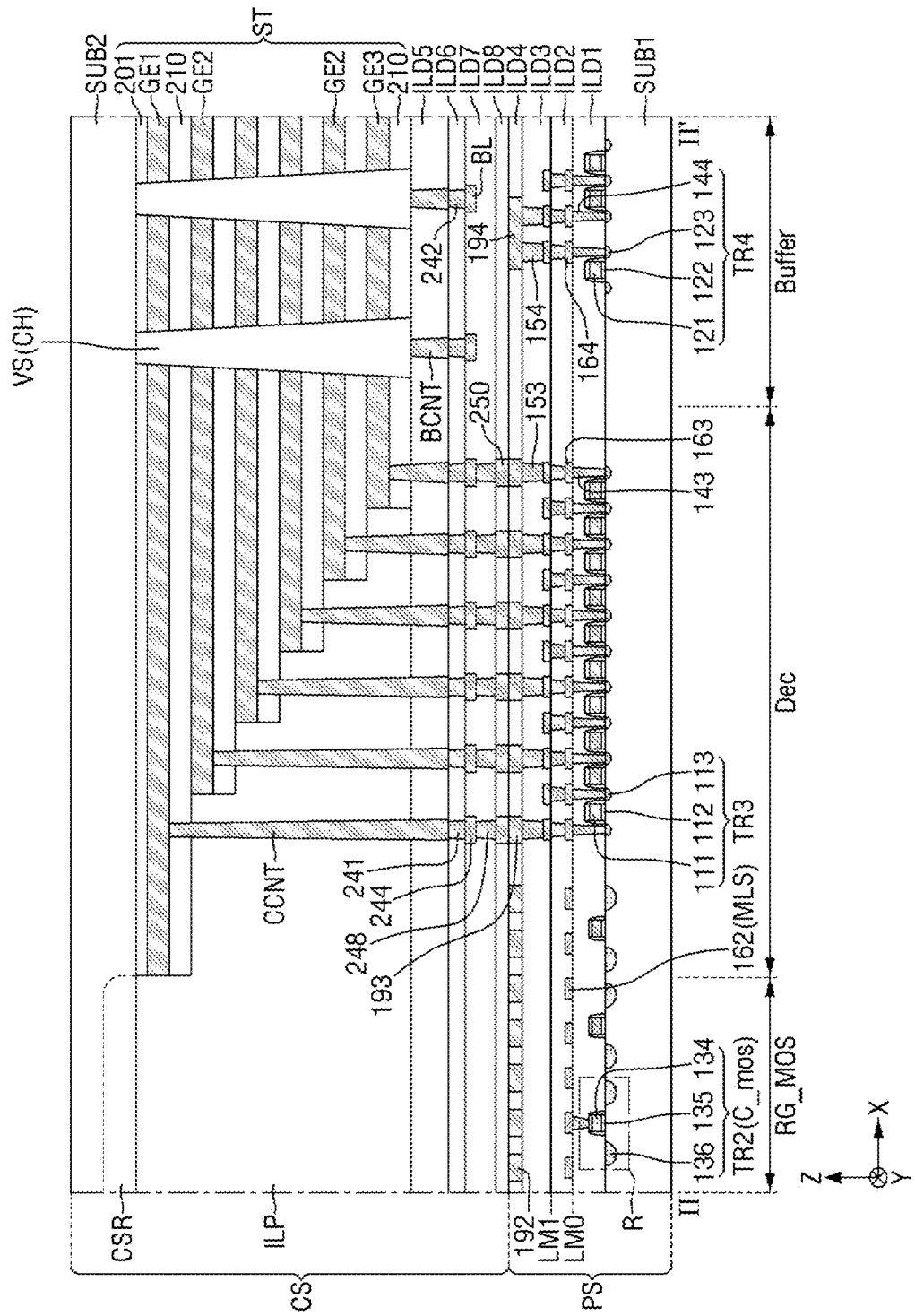
FIG. 9 is a cross-sectional view taken along line II-II' of FIG. 6.
Figure 10:
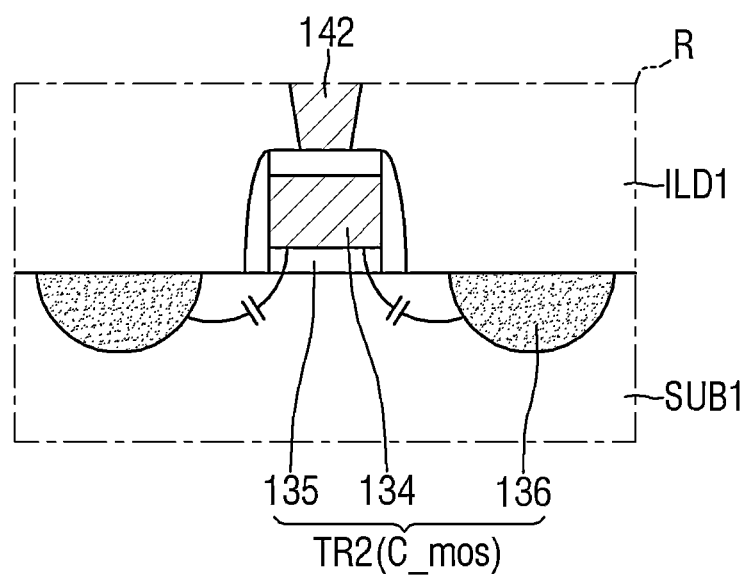
FIG. 10 is an enlarged view illustrating a region R of FIG. 9.

FIG. 6 is a plan view illustrating a portion of a nonvolatile memory according to an example embodiment of the present disclosure. FIG. 7 is an enlarged view illustrating the wiring region RG_ML of FIG. 6. FIG. 8 is a cross-sectional view taken along line I-I' of FIG. 6. FIG. 9 is a cross-sectional view taken along line II-II' of FIG. 6. FIG. 10 is an enlarged view illustrating a region R of FIG. 9.

Referring to FIGS. 6 to 10, the nonvolatile memory 30 that includes three-dimensional semiconductor memory cells may include a cell array structure CS and a peripheral logic structure PS. The cell array structure CS may be stacked vertically on the peripheral logic structure PS.

The peripheral logic structure PS may include a gate poly region RG_GP, a MOS capacitor region RG_MOS, a wiring region RG_ML, a decoder region DEC, and a buffer region Buffer.

The gate poly region RG_GP and the MOS capacitor region RG_MOS are disposed so as not to overlap each other in the third direction Z, and may correspond to the control logic 130 of FIG. 2.

At least a portion of the wiring region RG_ML may be disposed to overlap the gate poly region RG_GP and the MOS capacitor region RG_MOS in the third direction Z, and at least a portion of the wiring structure MLS disposed in the wiring region RG_ML may overlap the gate poly region RG_GP and the MOS capacitor region RG_MOS in the third direction Z.

The decoder region DEC may overlap stair structures STS of stacked structures ST disposed in the cell array structure CS. The decoder region DEC may be a region corresponding to the row decoder 110 of FIG. 2.

At least a portion of the buffer region Buffer may overlap a vertical structure VS disposed in the cell array structure CS in the third direction Z. The buffer region Buffer may be a region corresponding to the page buffer 120 of FIG. 2.

The peripheral logic structure PS may include a first substrate SUB1, first transistors TR1, second transistors TR2, third transistors TR3, fourth transistor TR4, second to fourth contacts 142, 143 and 144, third and fourth vias 153 and 154, second to fourth wires 162, 163 and 164, and first to third metal pads 192, 193 and 194.

The first substrate SUB1 may be a silicon substrate, a silicon-germanium substrate, a germanium substrate, or a single crystal epitaxial layer grown on a single crystal silicon substrate.

The first transistors TR1 may be disposed on an upper surface of the first substrate SUB1 in the gate poly region RG_GP. The first transistors TR1 may include a first gate electrode 131, a first gate insulating layer 132, and a first source/drain region 133.

The first gate electrode 131 may be extended in the second direction Y, and the first gate electrode 131 may be a passive element of the peripheral circuit 100, and may have resistance corresponding to the gate poly resistor R_gp of FIG. 5. Although not shown, the first gate electrode 131 may be connected to the first node Node_A of the wiring structure MLS, which will be described later, through a contact (not shown) extended in the third direction Z, and may apply the first voltage V1 (see FIG. 5) through the contact (not shown).

The first gate insulating layer 132 may be disposed between the first gate electrode 131 and the first substrate SUB1. The first source/drain region 133 may be disposed in the first substrate SUB1 on both sides of the first gate electrode 131.

The second transistor TR2 may be disposed on the upper surface of the first substrate SUB1 in the MOS capacitor region RG_MOS. The second transistor TR2 may include a second gate electrode 134, a second gate insulating layer 135, and a second source/drain region 136.

The second gate electrode 134 may be extended in the second direction Y, and the second gate insulating layer 135 may be disposed between the second gate electrode 134 and the first substrate SUB1. The second source/drain region 136 may be disposed in the first substrate SUB1 on both sides of the second gate electrode 134.

The second transistor TR2 may be a passive element of the peripheral circuit 100, and may have capacitance corresponding to the MOS capacitor C_mos of FIG. 5. The second transistor TR2 may operate as a capacitor having the second gate insulating layer 135 disposed between the second gate electrode 134 and the second source/drain region 136 as a dielectric layer. Although not shown, the second voltage V2 (see FIG. 5) of the second node Node_B may be applied to the second gate electrode 134 through the second contact 142, and the second source/drain region 136 may be grounded.

The third transistor TR3 may be disposed on the upper surface of the first substrate SUB1 in the decoder region DEC. The third transistors TR3 may include a third gate electrode 111, a third gate insulating layer 112, and a third source/drain region 113.

The third gate electrode 111 may be disposed on the decoder region DEC of the first substrate SUB1. The third gate insulating layer 112 may be disposed between the third gate electrode 111 and the first substrate SUB1. The third source/drain region 113 may be disposed in the first substrate SUB1 on both sides of the third gate electrode 111.

The fourth transistor TR4 may be disposed on the upper surface of the first substrate SUB1 in the buffer region Buffer. The fourth transistor TR4 may include a fourth gate electrode 121, a fourth gate insulating layer 122, and a fourth source/drain region 123.

The fourth gate electrode 121 may be disposed on the buffer region Buffer of the first substrate SUB1. The fourth gate insulating layer 122 may be disposed between the fourth gate electrode 121 and the first substrate SUB1. The fourth source/drain region 123 may be disposed in the first substrate SUB1 on both sides of the fourth gate electrode 121.

The first to fourth gate electrodes 131, 134, 111 and 121 may include a conductive material containing tungsten, aluminum, and conductive poly, and the first to fourth gate insulating layers 132, 135, 112, and 122 may include, for example, a thermal oxide layer or a high dielectric layer. The first to fourth source/drain regions 133, 136, 113 and 123 may include impurities having a conductivity type different from that of the first substrate SUB1.

A first interlayer dielectric layer ILD1 may be disposed on the first substrate SUB1. The first interlayer dielectric layer ILD1 may cover the first to fourth transistors TR1 to TR4. The first interlayer dielectric layer ILD1 may include, for example, a silicon oxide layer.

Although not shown, one contact (not shown) may be extended in the third direction Z and connected to the first node Node_A of the wiring structure MLS, which will be described later, by passing through the first interlayer dielectric layer ILD1.

The second contact 142 may electrically be connected to one of the second source/drain regions 136 and the second gate electrode 134 by passing through the first interlayer dielectric layer ILD1. The second contact 142 may be disposed on the MOS capacitor region RG_MOS of the first substrate SUB1.

The third contact 143 may electrically be connected to one of the third source/drain regions 113 and the third gate electrode 111 by passing through the first interlayer dielectric layer ILD1. The third contact 143 may be disposed on the decoder region DEC of the first substrate SUB1.

The fourth contact 144 may electrically be connected to one of the fourth source/drain regions 123 and the fourth gate electrode 121 by passing through the first interlayer dielectric layer ILD1. The fourth contact 144 may be disposed on the buffer region Buffer of the first substrate SUB1.

The second to fourth contacts 142, 143 and 144 may include a metal material containing copper, tungsten and aluminum, and a metal nitride containing a titanium nitride layer, a tungsten nitride layer and an aluminum nitride layer.

A second interlayer dielectric layer ILD2 and a third interlayer dielectric layer ILD3 may sequentially be stacked on the first interlayer dielectric layer ILD1. The second and third interlayer dielectric layers ILD2 and ILLD3 may include an insulating material (e.g., silicon oxide layer).

The second wire 162 includes a wiring structure MLS, at least a portion of which is disposed on the gate poly region RG_GP and the MOS capacitor region RG_MOS in the second interlayer dielectric layer ILD2 and the third interlayer dielectric layer ILD3.

Figure 7:
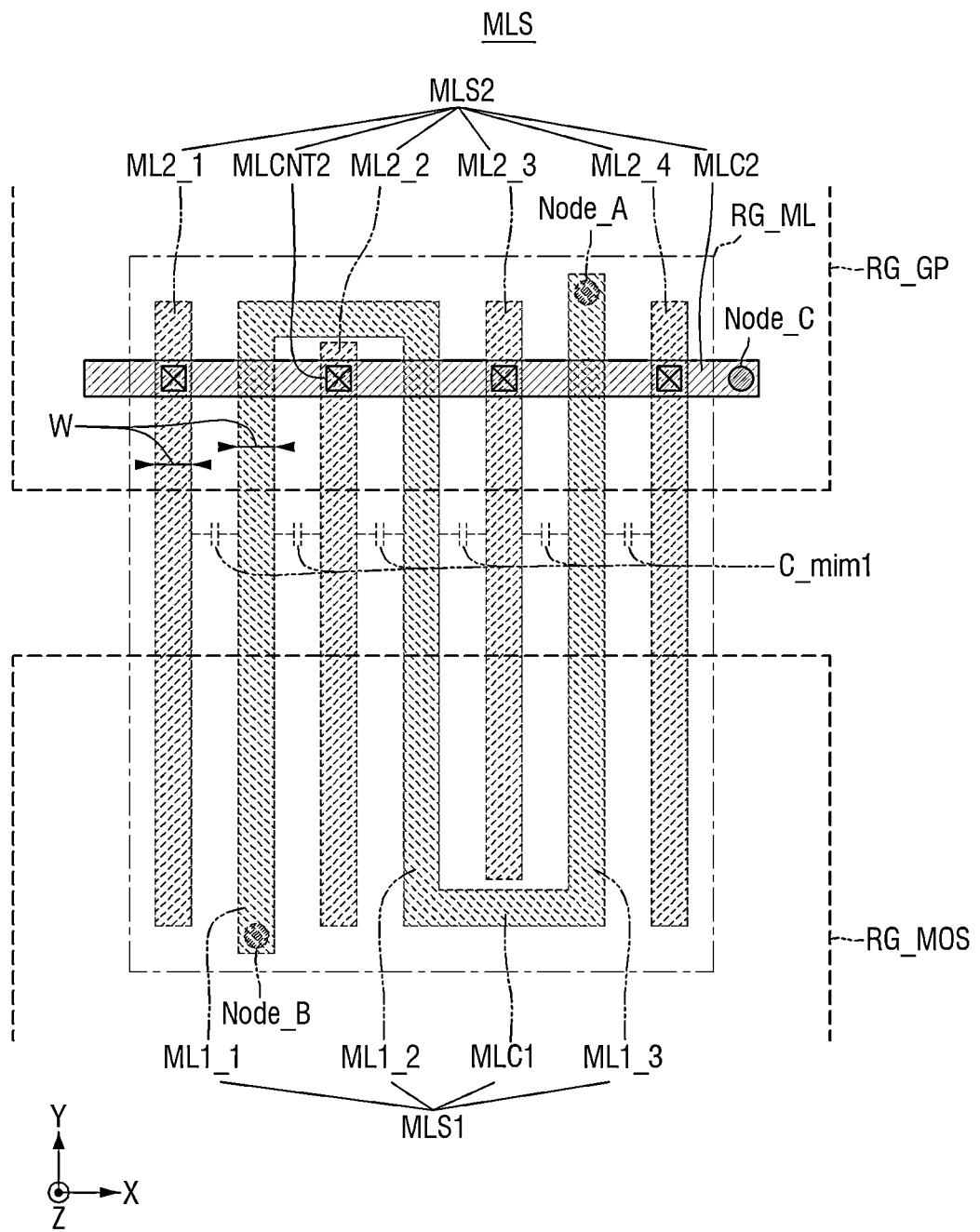
FIG. 7 is an enlarged view illustrating a wiring region RG_ML of FIG. 6.
Figure 8:
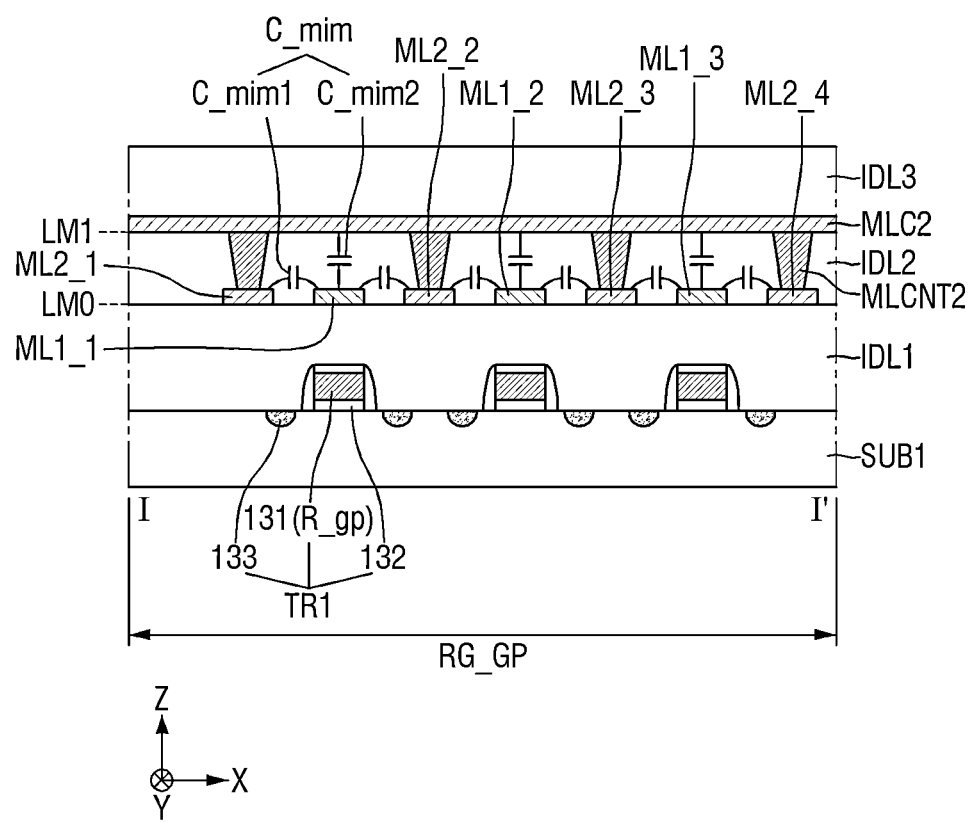
FIG. 8 is a cross-sectional view taken along line I-I' of FIG. 6.

Referring to FIGS. 6 to 8, the wiring structure MLS is disposed in the wiring region RG_ML, at least a portion of which overlaps the gate poly region RG_GP and the MOS capacitor region RG_MOS in the third direction Z.

The wiring structure MLS includes a first wiring structure MLS1 and a second wiring structure MLS2, and a first wiring structure MLS1 and a second wiring structure MLS2 are spaced apart from each other with the second interlayer dielectric layer ILD2 interposed therebetween.

The first wiring structure MLS1 includes (1_1)th to (1_3)th lines ML1_1 to ML1_3 extended from a (0)th wiring height LM0 in the second direction Y and spaced apart from one another in the first direction X, and a first wiring connection portion MLC1 for connecting the (1_1)th line ML1_1 with the (1_2)th line ML1_2 and connecting the (1_2)th line ML1_2 with the (1_3)th line ML1_3, wherein the (1_1)th and (1_2)th lines ML1_1 and ML1_2 are adjacent to each other and the (1_2)th and (1_3)th lines ML1_2 and ML1_3 are adjacent to each other at the (0)th wiring height LM0. The (0)th wiring height LM0 is matched with a height of a bottom surface of the second interlayer dielectric layer ILD2.

Therefore, the first wiring structure MLS1 is disposed in series between the first node Node_A and the second node Node_B in the order of the (1_3)th line ML1_3, the (1_2)th line ML1_2 and the (1_1)th line ML1_1. Therefore, resistance of the first wiring structure MLS1 corresponds to the wiring resistor R_mim.

The second wiring structure MLS2 includes (2_1)th to (2_4)th lines ML2_1 to ML2_4 extended from the (0)th wiring height LM0 in the second direction Y and spaced apart from one another in the first direction X, and a second wiring connection portion MLC2 extended from a first wiring height LM1 in the first direction X and disposed such that at least a portion crosses the (2_1)th to (2_4)th lines ML2_1 to ML2_4 two-dimensionally (e.g., in a plan view). The first wiring height LM1 is matched with a height of a bottom surface of the third interlayer dielectric layer ILD3.

Further, at least a portion of the second wiring connection portion MLC2 crosses the (1_1)th to (1_3)th lines ML1_1 to ML1_3 two-dimensionally (e.g., in a plan view).

The second wiring connection portion MLC2 is electrically connected with the (2_1)th to (2_4)th lines ML2_1 to ML2_4 through a second connection contact MLCNT2 extended in the third direction Z. Therefore, the (2_1)th to (2_4)th lines ML2_1 to ML2_4 in the second wiring structure MLS2 are connected in parallel through the second wiring connection portion MLC2 corresponding to the third node Node_C.

The (1_1)th to (1_3)th lines ML1_1 to ML1_3 and the (2_1)th to (2_4)th lines ML2_1 to ML2_4 have the same thickness W in the first direction X.

The (1_1)th to (1_3)th lines ML1_1 to ML1_3 and the (2_1)th to (2_4)th lines ML2_1 to ML2_4 are alternately disposed in the first direction X, and the (1_1)th line ML1_1 is disposed between the (2_1) line ML2_1 and the (2_2)th line ML2_2. Therefore, each of the first to third lines ML1_1 to ML1_3 and each of the (2_1)th to (2_4)th lines ML2_1 to ML2_4 form a first wiring capacitor C_mim1 in the first direction X with the second interlayer dielectric layer ILD2 interposed therebetween. The (1_1)th to (1_3)th lines ML1_1 to ML1_3 and the (2_1)th to (2_4)th lines ML2_1 to ML2_4 may include a conductive material containing tungsten, copper, aluminum, etc. In one example embodiment, the (1_1)th to (1_3)th lines ML1_1 to ML1_3 and the (2_1)th to (2_4)th lines ML2_1 to ML2_4, which are disposed at the (0)th wiring height LM0, may include the same material.

The second wiring connection portion MLC2 and the (1_1)th to (1_3)th lines ML1_1 to ML1_3 form a second wiring capacitor C_mim2 in the third direction Z with the second interlayer dielectric layer ILD2 disposed between the second line connection portion MLC2 and the (1_1)th to (1_3)th lines ML1_1 to ML1_3 in the third direction Z. The second wiring connection portion MLC2 may include a conductive material containing tungsten, copper, aluminum, etc. In one example embodiment, the second wiring connection portion MLC2 may include a material different from that of the other lines at the (0)th wiring height LM0.

The first wiring capacitor C_mim1 and the second wiring capacitor C_mim2 are included in or correspond to the wiring capacitor C_mim of FIG. 5.

The third wire 163 is extended from the decoder region DEC in the first direction X or the second direction Y in the second interlayer dielectric layer ILD2 and the third interlayer dielectric layer ILD3. The third via 153 extended in the third direction Z is electrically connected between the third wires 163. The third wire 163 and the third via 153 may include a conductive material containing tungsten, copper, aluminum, etc.

The fourth wire 164 is extended from the buffer region Buffer in the first direction X or the second direction Y in the second interlayer dielectric layer ILD2 and the third interlayer dielectric layer ILD3. The fourth via 154 extended in the third direction Z is electrically connected between the fourth wires 164. The fourth wire 164 and the fourth via 154 may include a conductive material containing tungsten, copper, aluminum, etc.

A fourth interlayer dielectric layer ILD4 may be disposed on the third interlayer dielectric layer ILD3. The fourth interlayer dielectric layer ILD4 may cover an upper surface of the third interlayer dielectric layer ILD3 and upper surfaces of the third and fourth vias 153 and 154 of the uppermost layer. The fourth interlayer dielectric layer ILD4 may include an insulating material (e.g., silicon oxide layer).

The second metal pad 192 may two-dimensionally overlap (e.g., overlap in a plan view) the second wire 162 in the fourth interlayer dielectric layer ILD4. Although not shown in the drawing, the second metal pad 192 may electrically be connected with the second wire 162. The second metal pad 192 may be exposed by an uppermost surface of the peripheral logic structure PS. Although not shown, the second metal pad 192 may be bonded to a metal pad exposed at the uppermost surface of the cell array structure CS in the third direction Z.

The third metal pad 193 may be in contact with the third via 153 of the uppermost layer in the fourth interlayer dielectric layer ILD4. The third metal pad 193 may be exposed by the uppermost surface of the peripheral logic structure PS, and may be bonded to a fifth metal pad 250 exposed at the uppermost surface of the cell array structure CS in the third direction Z.

The fourth metal pad 194 may be in contact with the fourth via 154 of the uppermost layer in the fourth interlayer dielectric layer ILD4. The fourth metal pad 194 may be exposed by the uppermost surface of the peripheral logic structure PS. Although not shown, the fourth metal pad 194 may be bonded to a metal pad exposed at the uppermost surface of the cell array structure CS in the third direction Z.

The second to fourth metal pads 192, 193, and 194 may include a metal material containing copper, tungsten, etc.

The cell array structure CS disposed on the peripheral logic structure PS may include a second substrate SUB2, stacked structures ST, a vertical structure VS, a cell contact CCNT, and bit lines BL.

The second substrate SUB2 may be spaced apart to be farthest from the first substrate SUB1 in the third direction Z. The second substrate SUB2 may be a silicon substrate, a silicon-germanium substrate, a germanium substrate, or a single crystal epitaxial layer grown on a single crystal silicon substrate.

Each of the stacked structures ST may include a buffer insulating layer 201, gate electrodes GE1, GE2 and GE3, and insulating patterns 210.

The gate electrodes GE1, GE2 and GE3 may be stacked on the second substrate SUB2. The gate electrodes GE1, GE2 and GE3 may include a ground selection gate electrode GE1, a string selection gate electrode GE3 and cell gate electrodes GE2 between the ground selection gate electrode GE1 and the string selection gate electrode GE3. Lengths of the gate electrodes GE1, GE2 and GE3 in the first direction X may be reduced as the gate electrodes are far away from the second substrate SUB2. For example, the length of the ground selection gate electrode GE1 in the first direction X may be the longest among the gate electrodes GE1, GE2 and GE3, and the length of the string selection gate electrode GE3 in the first direction X may be the shortest among the gate electrodes GE1, GE2 and GE3.

The gate electrodes GE1, GE2 and GE3 may include at least one of tungsten or metal nitride (e.g., tungsten nitride, titanium nitride, tantalum nitride metal material). The buffer insulating layer 201 may be disposed between the second substrate SUB2 and the ground selection gate electrode GE1. The buffer insulating layer 201 may include, for example, a thermal oxide layer.

The insulating patterns 210 may be disposed among the gate electrodes GE1, GE2 and GE3 adjacent to one another in the third direction Z. The insulating pattern 210 of the uppermost layer may be disposed on the string selection gate electrode GE3. Lengths of the insulating patterns 210 in the first direction X may be reduced as the insulating patterns 210 are far away from the second substrate SUB2. For example, the length of each of the insulating patterns 210 in the first direction X may substantially be the same as the length of the corresponding gate electrode in the first direction X, which is adjacent to the second substrate SUB2 among the gate electrodes GE1, GE2 and GE3 adjacent to one another in the third direction Z. The length of the insulating pattern 210 of the uppermost layer in the first direction X may substantially be the same as the length of the string selection gate electrode GE3 in the first direction X. The insulating patterns 210 may include, for example, a silicon oxide layer.

The vertical structures VS may be disposed in the stacked structure ST, and may correspond to the plurality of cell strings NS11, NS21, NS31, NS12, NS22, NS32, NS13, NS23 and NS33 of FIG. 4, respectively. For example, the vertical structures VS may pass through the cell gate electrodes GE2, the string selection gate electrode GE3, and the insulating pattern 210. The vertical structures VS may have a width that becomes wider as they are far away from the second substrate SUB2. The vertical structures VS may be arranged in a zigzag pattern in the first direction X. Sidewalls of the vertical structures VS may be flat.

The vertical structures VS may include a single layer or a plurality of layers, respectively, as a channel structure CH. The vertical structures VS may include at least one of a single crystalline silicon layer, an organic semiconductor layer, or carbon nanostructures. Further, the vertical structures VS include charge storage structures having a shape surrounding outer walls.

The charge storage structures may include a tunnel insulating layer, a blocking insulating layer, and a charge storage layer. The tunnel insulating layer TL, the blocking insulating layer BLL and the charge storage layer may include, for example, a single layer or a plurality of layers, which includes (or include) at least one of a silicon oxide layer, a silicon nitride layer, a silicon oxynitride layer, or a high dielectric layer.

Although not shown, a second substrate SUB2 and a semiconductor material layer may be disposed, and the semiconductor material layer may include a semiconductor having the same conductivity type as that of the second substrate SUB2, or an intrinsic semiconductor.

A common source region CSR may be disposed in the second substrate SUB2 between the stacked structures ST. The common source region CSR may have a conductivity type different from that of the second substrate SUB2. The common source region CSR may be exposed by the stacked structures ST An interlayer insulating pattern ILP may be disposed on the second substrate SUB2. The interlayer insulating pattern ILP may cover stair structures STS of the stacked structures ST disposed on the second substrate SUB2 and the stacked structures ST. The interlayer insulating pattern ILP may include, for example, a silicon oxide layer.

A fifth interlayer dielectric layer ILD5 may be disposed on the stacked structures ST and the interlayer insulating pattern ILP. The fifth interlayer dielectric layer ILD5 may include, for example, a silicon oxide layer.

A cell contact CCNT may be disposed on the stair structures STS of the stacked structures ST of the second substrate SUB2. The cell contact CCNT may be disposed on ends of the gate electrodes GE1, GE2 and GE3 extended onto the second substrate SUB2. The cell contact CCNT may be in contact with the ends of the gate electrodes GE1, GE2 and GE3 by passing through the fifth interlayer dielectric layer ILD5 and the interlayer insulating pattern ILP. The cell contact CCNT may be electrically connected with the gate electrodes GE1, GE2 and GE3. The cell contact CCNT may include at least one of a metal material (e.g., tungsten, copper and aluminum) or a metal nitride (e.g., tungsten nitride, tantalum nitride, titanium nitride, and aluminum nitride).

A bit line contact BCNT may be disposed on the vertical structure VS. The bit line contact BCNT may be disposed on the vertical structure VS by passing through the fifth interlayer dielectric layer ILD5. The bit line contact BCNT may be electrically connected with the vertical structure VS. The bit line contact BCNT may include at least one of a metal material (e.g., tungsten, copper, and aluminum) or a metal nitride (e.g., tungsten nitride, tantalum nitride, titanium nitride, and aluminum nitride).

A sixth interlayer dielectric layer ILD6 may be disposed on the fifth interlayer dielectric layer ILD5. The sixth interlayer dielectric layer ILD6 may include, for example, a silicon oxide layer. Fifth vias 241 may be disposed on the cell contact CCNT. The fifth vias 241 may be in contact with the cell contact CCNT by passing through the sixth interlayer dielectric layer ILD6. Sixth vias 242 may be disposed on the bit line contact BCNT. The sixth vias 242 may be in contact with the bit line contact BCNT by passing through the sixth interlayer dielectric layer ILD6. The fifth and sixth vias 241 and 242 may include a conductive material (e.g., tungsten, copper, and aluminum).

A fifth wire 244 may be disposed on the sixth interlayer dielectric layer ILD6. The fifth wire 244 may be in contact with surfaces (e.g., bottom surfaces) of the fifth vias 241. Bit lines BL may be disposed on the sixth interlayer dielectric layer ILD6. The bit lines BL may be in contact with surfaces (e.g., bottom surfaces) of the sixth vias 242. The bit lines BL may be electrically connected with the vertical structures VS. The bit lines BL may be extended in the second direction Y, and may be spaced apart from each other in the first direction X crossing the second direction Y. The fifth wire 244 and the bit lines BL may include a metal material (e.g., tungsten, copper and aluminum).

A seventh interlayer dielectric layer ILD7 may be disposed on the sixth interlayer dielectric layer ILD6. The seventh interlayer dielectric layer ILD7 may cover the fifth wire 244 and the bit lines BL. The seventh interlayer dielectric layer ILD7 may include a silicon oxide layer.

Seventh vias 248 may be disposed in the seventh interlayer dielectric layer ILD7. The seventh vias 248 may be in contact with the fifth wire 244. The seventh vias 248 may include a metal material (e.g., tungsten, copper, and aluminum).

An eighth interlayer dielectric layer ILD8 may be disposed on the seventh interlayer dielectric layer ILD7. The eighth interlayer dielectric layer ILD8 may cover one surfaces of the seventh vias 248. The eighth interlayer dielectric layer ILD8 may include, for example, a silicon oxide layer. The fifth metal pad 250 may be disposed in the eighth interlayer dielectric layer ILD8. The fifth metal pad 250 may be in contact with the seventh vias 248, and may be electrically connected with the seventh vias 248. The fifth metal pad 250 may be disposed to correspond to the third metal pad 193, and may be in contact with the third metal pad 193. That is, the third metal pad 193 and the fifth metal pad 250 may function as bonding pads for connecting the cell array structure CS with the peripheral logic structure PS.

The nonvolatile memory 30 of the present disclosure may include the wiring structure MLS used as the RC element to reduce an area occupied two-dimensionally (e.g., in a plan view) by the gate poly region RG_GP/MOS capacitor region RG_MOS in which the gate poly resistor R_gp/MOS capacitor C_mos is disposed, and may enhance resistance and performance of the capacitor through the arrangement of the wiring structure MLS.

Further, the structure and arrangement of the wiring structure MLS of the present disclosure is not limited only to application in the delay circuit 130_D of the control logic 130, but is applicable to any circuit including an RC element, such as a linear regulator including an RC element and configured to remove signal noise and convert a voltage and.

Figure 11:
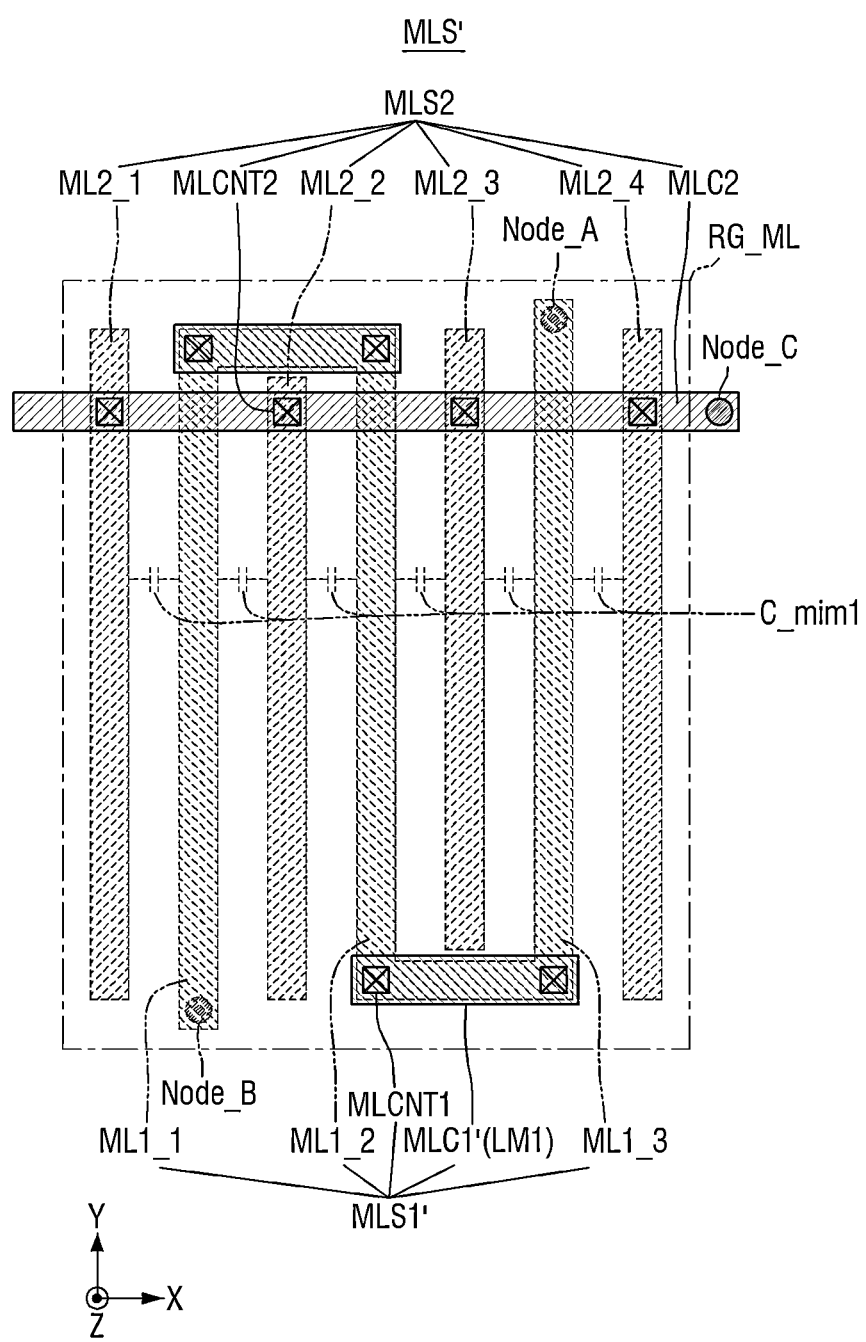
FIG. 11 is a plan view illustrating a wiring structure according to an example embodiment of the present disclosure.

FIG. 11 is a plan view illustrating a wiring structure MLS' according to an example embodiment of the present disclosure. For convenience of description, the wiring structure MLS' will be described based on a difference from the wiring structure MLS described with reference to FIGS. 6 to 8.

A first wiring connection portion MLC1' is disposed at the first wiring height LM1 that is higher than the (0)th wiring height LM0, and the first wiring connection portion MLC1' is electrically connected with the (1_1)th to (1_3)th lines ML1_1 to ML1_3 through a first connection contact MLCNT1.

Therefore, the first wiring connection portion MLC1' connects the (1_1)th line ML1_1 with the (1_2)th line ML1_2 and connects the (1_2)th line ML1_2 with the (1_3)th line ML1_3 through the first connection contact MLCNT1 extended in the third direction Z, wherein the (1_1)th and (1_2)th lines ML1_1 and ML1_2 are adjacent to each other, and the (1_2)th and (1_3)th lines ML1_2 and ML1_3 are adjacent to each other.

Figure 12:
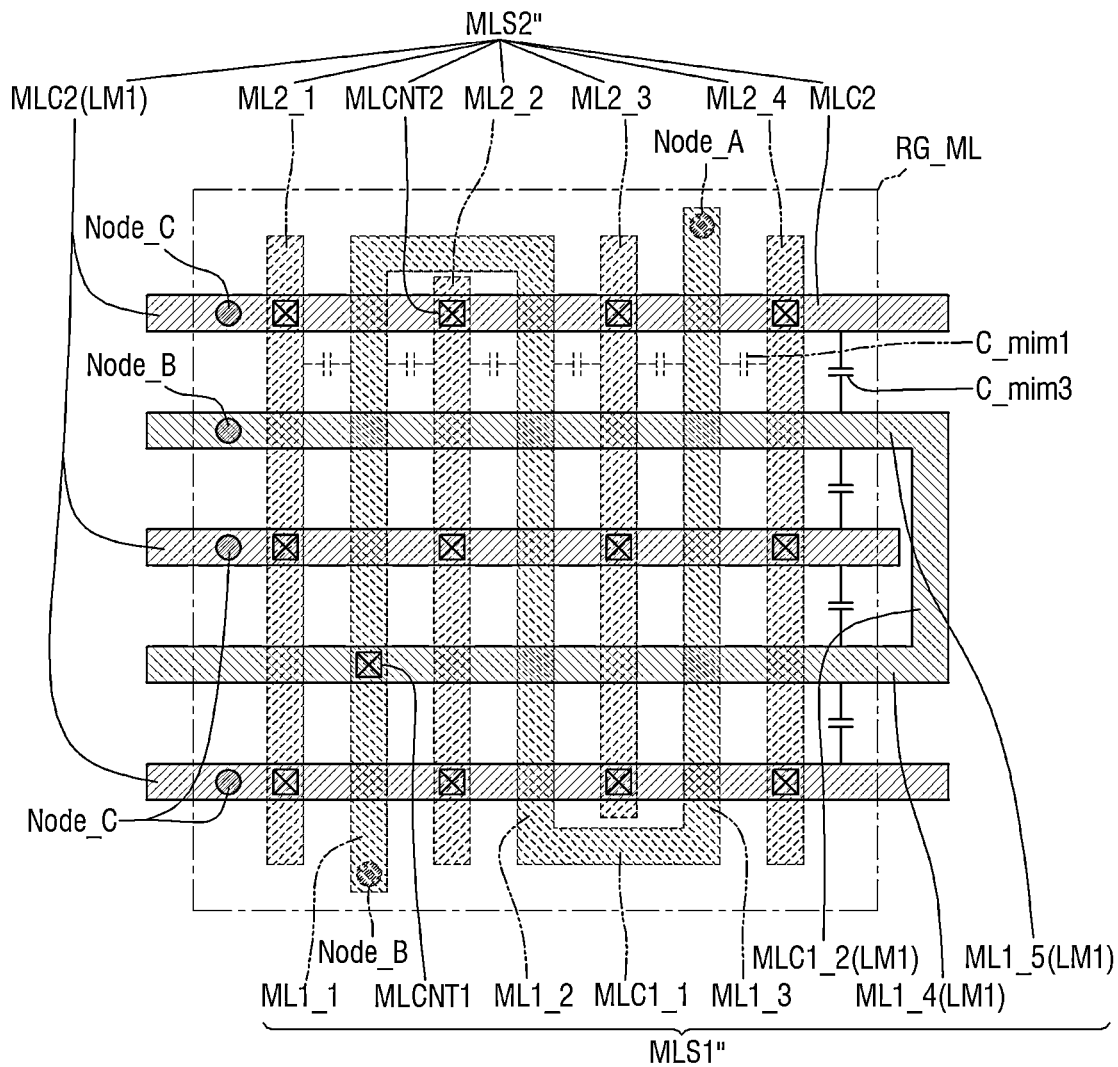
FIG. 12 is a plan view illustrating a wiring structure according to an example embodiment of the present disclosure.

FIG. 12 is a plan view illustrating a wiring structure MLS" according to an example embodiment of the present disclosure. For convenience of description, the wiring structure MLS" will be described based on a difference from the wiring structure MLS described with reference to FIGS. 6 to 8.

The first wiring structure MLS1" further includes (1_4)th and (1_5)th lines ML1_4 and ML1_5 extended from the first wiring height LM1 in the first direction X and spaced apart from each other in the second direction Y, and further includes a (1_2)th wiring connection portion MLC1_2 extended from the first wiring height LM1 in the second direction Y, connecting the (1_4)th line ML1_4 with the (1_5)th line ML1_5.

The first wiring connection portion MLC1 of FIGS. 6 to 8 corresponds to the (1_1)th wiring connection portion MLC1_1 of FIG. 12.

The (1_4)th line ML1_4 is electrically connected with the (1_1)th line ML1_1 through the first connection contact MLCNT1 extended in the third direction Z, and the first wiring structure MLS1" is disposed in series between the first node Node_A and the second node Node_B in the order of the (1_3)th line ML1_3, the (1_2)th line ML1_2, the (1_1)th line ML1_1, the (1_4)th line ML1_4 and the (1_5)th line ML1_5.

The second wiring structure MLS2" includes a plurality of second wiring connection portions MLC2 extended from the first wiring height LM1 in the first direction X.

The (1_4)th and (1_5)th lines ML1_4 and ML1_5 and the plurality of second wiring connection portions MLC2 are alternately disposed in the second direction Y, and the (1_4)th line ML1_4 is disposed between the plurality of second wiring connection portions MLC2. Therefore, each of the (1_4)th and (1_5)th lines ML1_4 and ML1_5 and the plurality of second wiring connection portions MLC2 form a third wiring capacitor C_mim3 in the second direction Y with the third interlayer dielectric layer ILD3 interposed therebetween.

The wiring capacitor C_mim further includes a third wiring capacitor C_mim3.

Figure 13:
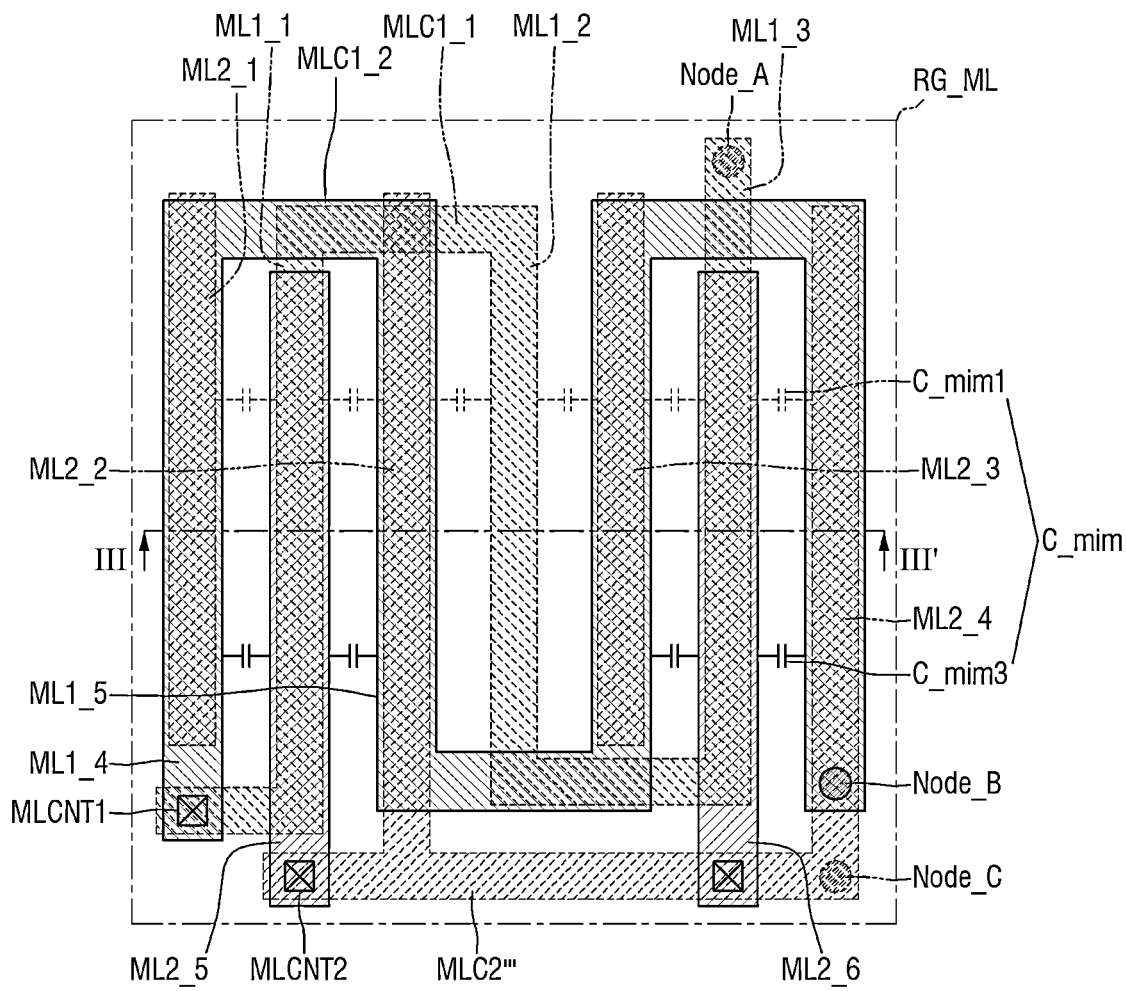
FIG. 13 is a plan view illustrating a wiring structure according to an example embodiment of the present disclosure.
Figure 14:
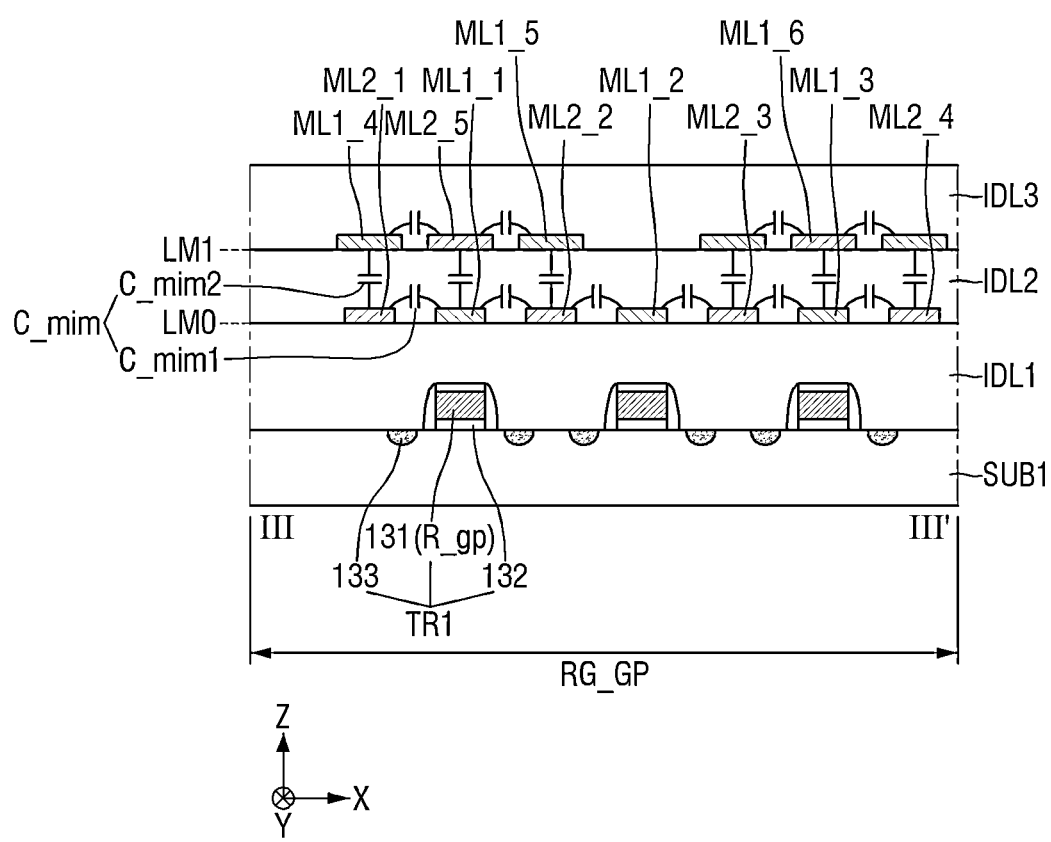
FIG. 14 is a cross-sectional view taken along line III-III' of FIG. 13.

FIG. 13 is a plan view illustrating a wiring structure MLS''' according to an example embodiment of the present disclosure. FIG. 14 is a cross-sectional view taken along line III-III' of FIG. 13.

For convenience of description, the wiring structure MLS''' will be described based on a difference from the wiring structure MLS" described with reference to FIG. 12.

The (1_4)th and (1_5)th lines ML1_4 and ML1_5 are extended from the first wiring height LM1 in the second direction Y and disposed to be spaced apart from each other in the first direction X. The (1_4)th line ML1_4 overlaps the (2_1)th line ML2_1 in the third direction Z, and the (1_5)th line ML1_5 overlaps the (2_2)th line ML2_2 in the third direction Z.

The second wiring structure MLS2''' further includes (2_5)th and (2_6)th lines ML2_5 and ML2_6 extended from the first wiring height LM1 in the second direction Y and spaced apart from each other in the first direction X.

For example, the (2_5)th line ML2_5 is disposed between the (1_4)th line ML1_4 and the (1_5)th line ML1_5, and the third wiring capacitor C_mim3 is formed between the (2_5)th line ML2_5 and the (1_4)th line ML1_4 and between the (2_5)th line ML2_5 and the (1_5)th line ML1_5 in the first direction X.

The second wiring connection portion MLC2''' of the second wiring structure MLS2''' is extended from the (0)th wiring height LM0 in the first direction X.

Figure 15:
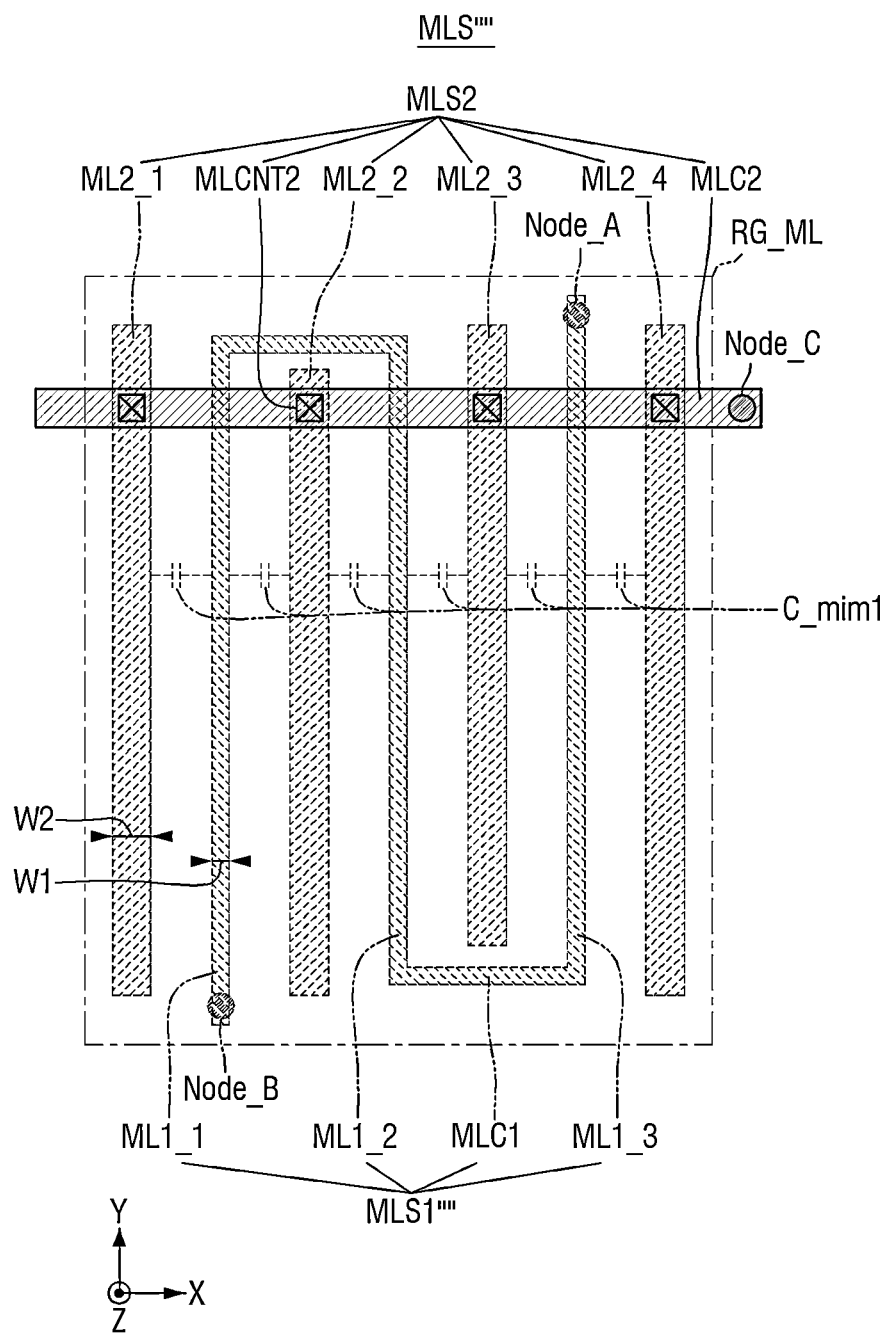
FIG. 15 is a plan view illustrating a wiring structure according to an example embodiment of the present disclosure.

FIG. 15 is a plan view illustrating a wiring structure MLS'''' according to an example embodiment of the present disclosure. For convenience of description, the wiring structure MLS'''' will be described based on a difference from the wiring structure MLS described with reference to FIG. 6 to FIG. 8.

The (1_1)th to (1_3)th lines ML1_1 to ML1_3 have a first thickness W1 in the first direction X, and the (2_1)th to (2_4)th lines ML2_1 to ML2_4 have a second thickness W2 in the first direction X. The second thickness W2 is greater than the first thickness W1.

The first wiring structure MLS1'''' that includes the (1_1)th to (1_3)th lines ML1_1 to ML1_3 having the first thickness W1 is a resistor and may improve resistance performance by reducing a line width.

Any functional blocks shown in the figures and described above may be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

In concluding the detailed description, those skilled in the art will appreciate that many variations and modifications may be made to the disclosed example embodiments without substantially departing from the principles of the present disclosure. Therefore, the disclosed example embodiments of the disclosure are used in a generic and descriptive sense only and not for purposes of limitation.

What is claimed is:

1. A semiconductor memory device comprising:
a memory cell array on a substrate, the memory cell array including a memory cell configured to store data;
a peripheral circuit element on an upper surface of the substrate, the peripheral circuit element configured to control an operation of the memory cell array; and
a wiring structure on the peripheral circuit element, the wiring structure including a first wiring structure and a second wiring structure, the first wiring structure and the second wiring structure spaced apart from each other with an insulating layer interposed therebetween, the first wiring structure configured to receive a first voltage at one end thereof, the first wiring structure configured to receive a second voltage different from the first voltage at the other end thereof due to resistance of the first wiring structure, the second wiring structure configured to receive a third voltage different from the first and second voltages,
wherein the first wiring structure includes (1_1)th and (1_2)th lines extended in a first direction and spaced apart from each other in a second direction crossing the first direction,
the second wiring structure includes (2_1)th and (2_2)th lines extended in the first direction and spaced apart from each other in the second direction, and
the (1_1)th line is between the (2_1)th line and the (2_2)th line.

2. The semiconductor memory device of claim 1, wherein the (1_1)th line, the (1_2)th line, the (2_1)th line and the (2_2) line are at a same level, based on the substrate.

3. The semiconductor memory device of claim 2, wherein the (1_1)th line, the (1_2)th line, the (2_1)th line and the (2_2) line include a same conductive material.

4. The semiconductor memory device of claim 1, wherein the second wiring structure further includes a wiring connection portion extended in the second direction, at least a portion of which is disposed on the (1_1)th line, the (2_1)th line and the (2_2)th line, and
the (2_1)th line and the wiring connection portion are connected with each other through a connection contact.

5. The semiconductor memory device of claim 1, wherein the first wiring structure further includes a first wiring connection portion extended in the second direction and electrically connecting the (1_1)th line with the (1_2)th line.

6. The semiconductor memory device of claim 5, wherein the first wiring connection portion is at a same level as the (1_1)th line, based on the substrate.

7. The semiconductor memory device of claim 5, wherein the first wiring connection portion is at a higher level than the (1_1)th line, based on the substrate, and
the (1_1)th line and the first wiring connection portion are connected with each other through a connection contact.

8. The semiconductor memory device of claim 1, wherein the (1_1)th line has a first thickness in the second direction, and the (2_1)th line has a second thickness greater than the first thickness in the second direction.

9. The semiconductor memory device of claim 1, wherein
the first wiring structure further includes a (1_3)th line at a higher level than the (1_1)th line, based on the substrate, and
the (1_3)th line is electrically connected with any one of the (1_1)th line and the (1_2)th line through a connection contact.

10. The semiconductor memory device of claim 9, wherein
the (1_3)th line is extended in the second direction, and
at least a portion of the (1_3)th line crosses the (1_1)th line, the (1_2)th line, the (2_1)th line and the (2_2)th line in a plan view.

11. The semiconductor memory device of claim 9, wherein
the (1_3)th line is extended in the first direction, and
at least a portion of the (1_3)th line is on any one of the (2_1)th line and the (1_2)th line.

12. A semiconductor memory device comprising:
a memory cell array on a substrate, the memory cell array including a memory cell configured to store data;
a peripheral circuit element on an upper surface of the substrate, the peripheral circuit element configured to control an operation of the memory cell array; and
a wiring structure including first and second wiring structures, the first and second wiring structures connected with the peripheral circuit element through a contact vertically extended onto the substrate, the first and second wiring structures spaced apart from each other with an insulating layer interposed therebetween, a first voltage being applied to one end of the first wiring structure, a second voltage different from the first voltage being applied to the other end of the first wiring structure by resistance of the first wiring structure, and a third voltage different from the first and second voltages being applied to the second wiring structure,
wherein at least a portion of the first wiring structure and at least a portion of the second wiring structure are at a same level based on the substrate.

13. The semiconductor memory device of claim 12, wherein
the first wiring structure includes (1_1)th and (1_2)th lines extended in a first direction and spaced apart from each other in a second direction crossing the first direction,
the second wiring structure includes (2_1)th and (2_2)th lines extended in the first direction and spaced apart from each other in the second direction, and
the (1_1)th line is between the (2_1)th line and the (2_2)th line.

14. The semiconductor memory device of claim 13, wherein
the second wiring structure further includes a wiring connection portion extended in the second direction, at least a portion of the wiring connection portion being on the (1_1)th line, the (2_1)th line and the (2_2)th line, and
the (2_1)th line and the wiring connection portion are connected with each other through a connection contact.

15. The semiconductor memory device of claim 13, wherein the (1_1)th line has a first thickness in the second direction, and the (2_1)th line has a second thickness greater than the first thickness in the second direction.

16. The semiconductor memory device of claim 12, wherein the peripheral circuit element is electrically connected with one end of the first wiring structure through the contact, and the first voltage is provided through the contact.

\* \* \* \* \*